United States Patent
de Ruijter et al.

(10) Patent No.: US 11,611,360 B2
(45) Date of Patent: Mar. 21, 2023

(54) APPARATUS FOR RECEIVER WITH CONCURRENT DETECTION AND ASSOCIATED METHODS

(71) Applicant: Silicon Laboratories Inc., Austin, TX (US)

(72) Inventors: Hendricus de Ruijter, Austin, TX (US); Güner Arslan, Austin, TX (US); Wentao Li, Austin, TX (US); Michael Wu, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/886,645

(22) Filed: May 28, 2020

(65) Prior Publication Data

US 2021/0135692 A1    May 6, 2021

Related U.S. Application Data

(63) Continuation-in-part of application No. 16/668,834, filed on Oct. 30, 2019, now abandoned.

(51) Int. Cl.
*H04B 1/00* (2006.01)
*H04L 27/00* (2006.01)
*H04B 1/16* (2006.01)

(52) U.S. Cl.
CPC ......... *H04B 1/0089* (2013.01); *H04B 1/0067* (2013.01); *H04B 1/0075* (2013.01); *H04B 1/16* (2013.01); *H04L 27/0008* (2013.01)

(58) Field of Classification Search
CPC ............... H04B 1/0067; H04B 1/0071; H04B 1/0075; H04B 1/0089; H04B 1/005; H04B 1/0053; H04B 1/0057; H04B 1/16; H04L 27/0008; H04L 27/0002

See application file for complete search history.

(56) References Cited

U.S. PATENT DOCUMENTS

| | | | | |
|---|---|---|---|---|
| 5,796,777 | A * | 8/1998 | Terlep | H04B 7/082 375/227 |
| 7,519,390 | B2 * | 4/2009 | Malone | H04B 1/0053 455/552.1 |
| 7,912,428 | B2 * | 3/2011 | Behzad | H04L 27/0002 455/76 |
| 8,774,328 | B2 * | 7/2014 | Elenes | H04L 27/0008 375/343 |
| 8,837,640 | B2 * | 9/2014 | Picard | H04L 27/0008 375/340 |
| 10,061,740 | B2 | 8/2018 | de Ruijter | |

(Continued)

OTHER PUBLICATIONS

U.S. Appl. No. 16/668,834, filed Oct. 2019, de Ruijter.
U.S. Appl. No. 15/370,674, filed Dec. 2016, de Ruijter.
U.S. Appl. No. 16/177,373, filed Oct. 2018, de Ruijter.

*Primary Examiner* — Betsy Deppe
(74) *Attorney, Agent, or Firm* — Law Offices of Maximilian R. Peterson

(57) ABSTRACT

An apparatus comprises an RF receiver for receiving an RF signal. The RF receiver includes front-end circuitry to generate a first down-converted signal, and a plurality of signal detectors to generate a corresponding plurality of detection signals from signals derived from the down-converted signal. The RF receiver further includes a controller to provide at least one control signal to the front-end circuitry based on the plurality of detection signals.

20 Claims, 20 Drawing Sheets

(56) References Cited

U.S. PATENT DOCUMENTS

| | | | |
|---|---|---|---|
| 10,389,482 B2 | 8/2019 | de Ruijter | |
| 10,469,112 B2 | 11/2019 | Coban | |
| 2005/0085203 A1* | 4/2005 | Suganuma | H04B 1/1661 |
| | | | 455/188.1 |

* cited by examiner

APPARATUS FOR RECEIVER WITH CONCURRENT DETECTION AND ASSOCIATED METHODS

CROSS-REFERENCE TO RELATED APPLICATIONS

This application is a continuation-in-part (CIP) of, and hereby incorporates by reference in its entirety for all purposes, U.S. patent application Ser. No. 16/668,834, filed on Oct. 30, 2019, titled "Apparatus for Radio-Frequency Receiver with Reduced Power Consumption and Latency and Associated Methods,".

TECHNICAL FIELD

The disclosure relates generally to communication apparatus and associated methods. More particularly, the disclosure relates to apparatus for radio-frequency (RF), such as RF receivers with concurrent detection, and associated methods.

BACKGROUND

With advances in technology, an increasing number of circuit elements have been integrated into devices, such as integrated circuits (ICs). Furthermore, a growing number of devices, such as ICs, or subsystems, have been integrated into products. With developments such as the Internet of Things (IoT), this trend is expected to continue.

The growing number of circuit elements, devices, subsystems, etc., has also resulted in a corresponding increase in the amount of power consumed in the products that include such components. In some applications, such as battery powered, mobile, or portable products, a limited amount of power or energy is available. Given the relatively small amount of power or energy available in such applications, reduced power consumption of the components or products provides advantages or benefits, for example, extending the battery life, increasing the "up-time" or active time of the system, and the like.

Even in non-portable environment, increased power consumption invariably results in larger amounts of generated heat, as the electrical energy is not used 100% efficiently. Thus, reduced power consumption of the components or products provides advantages or benefits, for example, reduced heat amounts, reduced cost of electricity, and the like.

The description in this section and any corresponding figure(s) are included as background information materials. The materials in this section should not be considered as an admission that such materials constitute prior art to the present patent application.

SUMMARY

A variety of apparatus and associated methods for RF apparatus are contemplated according to exemplary embodiments. According to one exemplary embodiment, an apparatus includes an apparatus comprises an RF receiver for receiving an RF signal. The RF receiver includes front-end circuitry to generate a first down-converted signal, and a plurality of signal detectors to generate a corresponding plurality of detection signals from signals derived from the down-converted signal. The RF receiver further includes a controller to provide at least one control signal to the front-end circuitry based on the plurality of detection signals.

According to another exemplary embodiment, an apparatus includes an apparatus comprises an RF receiver for receiving a receive signal. The RF receiver includes front-end circuitry to generate a first down-converted signal from the receive signal. The RF receiver further includes a plurality of preamble detectors to concurrently generate a corresponding plurality of detection signals corresponding to a plurality of physical layers (PHYs) from a set of signals derived from the first down-converted signal. The RF receiver further includes a controller to provide at least one control signal to the front-end circuitry based on the plurality of detection signals.

According to another exemplary embodiment, a method of operating an RF receiver includes generating, by using a front-end circuit, a down-converted signal from an RF signal. The method further includes generating, by using a plurality of signal detectors, a corresponding plurality of detection signals from signals derived from the down-converted signal. The method further includes providing, by using a controller, at least one control signal to the front-end circuitry based on the plurality of detection signals.

BRIEF DESCRIPTION OF THE DRAWINGS

The appended drawings illustrate only exemplary embodiments and therefore should not be considered as limiting the scope of the application or of the claimed subject-matter. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

Figure 1:
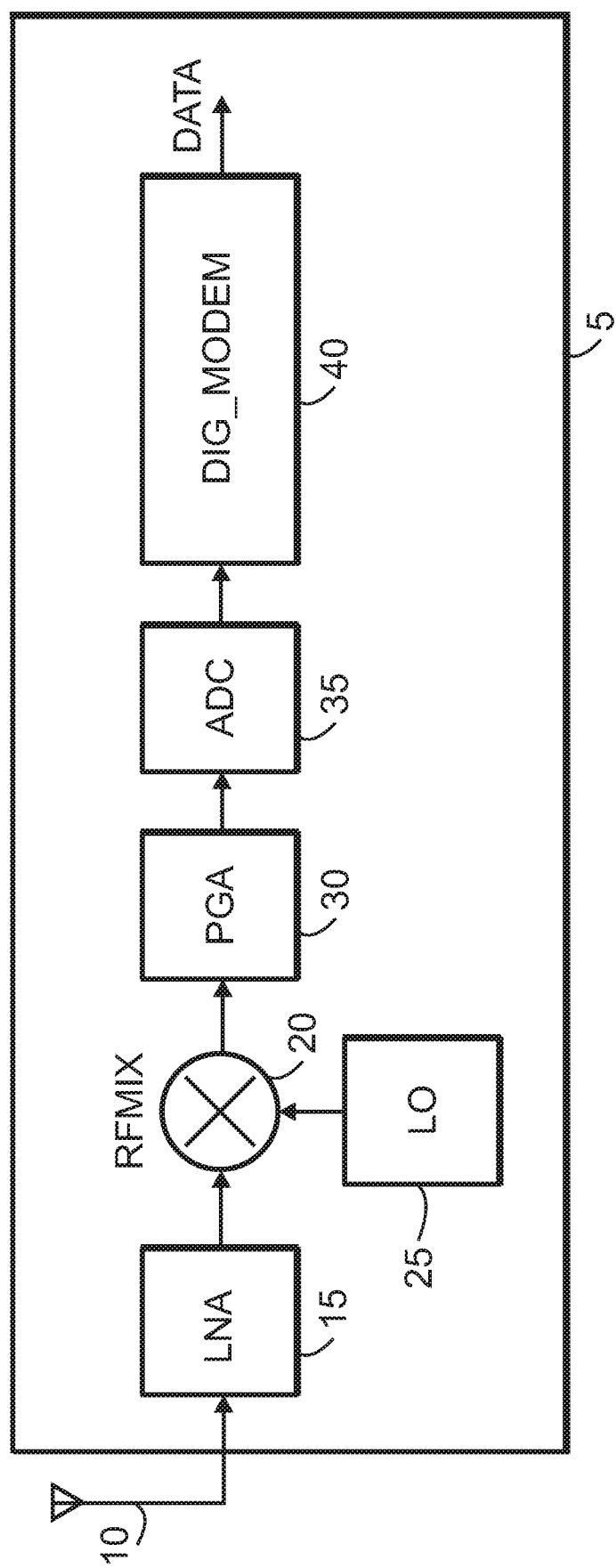
FIG. 1 shows a circuit arrangement for an RF receiver according to an exemplary embodiment.

The disclosure relates generally to communication apparatus and associated methods. More particularly, the disclosure relates to apparatus for multi-channel receivers with improved power consumption and latency, and associated methods. More specifically, RF receiver (RX) apparatus and related methods according to the disclosure aim to reduce energy consumption and latency in frequency scanning applications, also seeking to reduce cost and complexity. One aspect of the disclosure relates to RF apparatus that include receivers with concurrent preamble detection (or concurrent detection), and associated methods.

Some applications, such as IoT applications, for short-range wireless communications specify a receiver that can evaluate more than one frequency channels or physical layers (PHYs) or PHY modes (e.g., Zigbee and Bluetooth). In the context of the description, a frequency channel could be a channel or a frequency range, overlapping in frequency or separated in frequency. Examples include asynchronous frequency hopping, network discovery (e.g., passive scan in IEEE 802.15.4), scanning automatic frequency control (AFC), and received signal strength indication (RSSI) or energy detection scans. For the sake of brevity, the description refers to one or more or multiple frequency channels (multi-channel), but the disclosed techniques and apparatus are also applicable to multiple PHYs or PHY modes, as persons of ordinary skill in the art will understand.

The transmissions in such applications, like the IoT applications noted above, may take place on more than one carrier frequency. In addition, more than one modulation scheme or PHY or PHY mode may be used. In such applications, a system on chip (SOC) that includes the radio (RX, TX, or both) typically has a packet handler and protocol timer (either implemented in hardware, software, firmware, of a combination of them). Under these circumstances, RF receivers according to various embodiments avoid the duplication of various parts or blocks of the RF receiver, such as the packet handler and protocol timer.

When receiving a plurality of signals with different corresponding RF frequencies, RF receivers according to various embodiments avoid duplication of several digital processing functions. Digital processing typically entails processing of several layers of the protocol stack (including PHY, media access control (MAC), network layer). Typically, the digital processing uses a variety of resources, such as hardware, memory, and software. The RF receivers avoid the duplication of several digital processing functions by searching, with a plurality of signal detectors, for characteristics associated with the plurality of signals, and select a sub-set of the plurality of signals for digital processing or concurrent digital processing. The characteristics may be contained in the preamble or the sync word or the PHY header or the MAC header or a combination thereof. In some embodiments, the selection is based on first successful detection among the plurality of signal detectors (first come, first served) and subsequent detections are ignored when a sub-set of the plurality of signals is undergoing digital processing.

The signal detectors may include a variety of types of circuitry and detection techniques, as described below. The signal detectors provide signal quality metrics (metrics that that may indicate the likelihood of the received signal being a desired signal, e.g., having a frequency deviation within the limits of a pre-determined maximum and minimum deviation threshold, and/or a correlation with a desired symbol sequence (preamble and or sync word), and/or having a frequency error less than a pre-determined frequency-offset threshold, and/or signal-to-noise ratio (SNR) of more than a pre-determined SNR threshold, etc.) for the baseband signals they receive from a frequency converter circuit that produces frequency-shifted frequency channels (e.g., by mixing) to produce the baseband signals. In exemplary embodiments, the signal detectors may constitute any of preamble detectors, sync word detectors, RSSI detectors (i.e., to provide RSSI metrics for a received or provided signal), signal arrival detectors (e.g., as described in U.S. patent application Ser. No. 14/080,405, filed on Nov. 14, 2013, now U.S. Pat. No. 10,061,740), cost function detectors (e.g., as described in U.S. patent application Ser. No. 16/177, 373, filed on Oct. 31, 2018), correlators (e.g., as described in U.S. patent application Ser. No. 15/370,693, filed on Dec. 6, 2016, now U.S. Pat. No. 10,389,482), magnitude detectors, phase detectors, phase discriminators, differentiated phase detectors, phase click detectors, deviation detectors, or any combination of foregoing. Generally, any circuit or block that detects the presence of a desired or transmitted signal, such as an RF signal, in a frequency channel may be used. In addition, note that in exemplary embodiments, a scan through frequencies for non-desired signals may be performed, e.g., an RSSI scan can be done to determine a "clean" channel. Once a "clean" channel is found, then that channel can be used for transmission.

Some conventional approaches have been used in applications such as IoT applications. One approach is to evaluate one frequency at the time. This technique can be a relatively slow process because the receiver may repeat this evaluation many times. Also, this solution entails the frequency synthesizer's hopping from one frequency to the next, which adds settling time to complete the evaluation. A longer evaluation time translates to more energy consumption.

A second approach is to implement multiple intermediate-frequency (IF) paths, where each IF is followed by a corresponding demodulator. This approach has relatively high energy consumption for all the demodulators. In addition, multiple demodulators are costly in terms of die area, circuit complexity, etc. Furthermore, to demodulate multiple parallel channels entails running multiple frame controllers in parallel, which adds to the power consumption and to the cost, making this approach generally impractical for low power, low cost, IoT applications.

RF receivers according to various embodiments address the points mentioned above. Additional use cases also exist. As an example, Z-wave defines a separate frequency that the radio can receive frames on, while it also scans the other Z-Wave channels. A device supporting the simultaneous signal detection, according to various embodiments, would allow receiving a frame without the additional delay and power consumption associated with receivers that evaluate one frequency at the time. In turn, this attribute allows the transmitting device to use very short preambles and payload, thus reducing the energy per transmit (TX) frame. This scheme would enable the use of energy harvesting sources powering the transmitters.

Another example is asynchronous channel hopping, for example as described in https://www.silabs.com/community/wireless/proprietary/knowledge-base.entry.html/2019/06/20/channel_scanning-8x31. This scheme specifies that a node shall be able to scan several channels for a signal with limited preamble length. This specification leaves relatively few preamble symbols per channel to detect a preamble, which limits the time to detect the signal reliably. By receiving multiple channels simultaneously, RF receivers according to various embodiments make more time available per channel. This time can be used to improve the signal quality detection performance (e.g. less false positive detection), or save power by going to sleep or become idle, for example, in the preamble sense mode.

Another example is Bluetooth low energy (BLE). BLE specifies relatively fast channel scanning, for example, during search for advertising packets. RF receivers according to various embodiments can accommodate the BLE fast channel scanning.

In exemplary embodiments, the RF receiver is able to detect signals in multiple frequency channels simultaneously without the overhead of multiple parallel demodulators. The RF receiver does so by using relatively simple and low power signal detectors (one per IF path) and at least one demodulator. In most IoT use cases one demodulator would suffice. The signal detectors can have much lower complexity and lower power compared to the conventional multiple demodulator solution, thus saving power and reducing complexity and/or cost.

In exemplary embodiments, a multi frequency channel RF receiver is used for receiving at least one receive signal in a plurality of the frequency channels. It does so by using a front-end circuit in the RF receive circuitry to apply frequency shifts to the frequency channels to produce a plurality of filtered baseband signals. Signal detectors are used to simultaneously measure the signal quality of each filtered baseband signal. A controller selects (at least) one of the filtered baseband signals for demodulation by (at least one) demodulator.

The RF receiver according to various embodiments makes use of the low duty cycle activity, found in some applications, such as in IoT sensor networks. For example, a door sensor, a light switch, a motion sensor, or a glass break detector may trigger fewer than ~10 times a day. In other words, the RF receiver has a low duty cycle of operation (e.g., idle or asleep, at least in part, most of the time). In these low duty cycle use cases, it is more efficient to operate multiple signal detectors than operating multiple demodulators. In most cases one demodulator may suffice which reduces the cost. For instance, the die area on a chip or IC could be reduced or saved.

It may be that none of the signal detectors detect a valid signal in any of the filtered baseband signals. In this case, the demodulator(s) may stay in a non-active low power state. When, sometime later, a signal detector triggers, then the controller may wake-up a demodulator and provide the associated filtered baseband signal to the demodulator for demodulation. For example, if signal detector 1 triggers, then a controller may provide filtered baseband signal 1 (provided by IF circuit 1) to the demodulator for demodulation.

In the case that multiple PHYs or multiple PHY modes are used, on multiple frequency channels, the RF receiver according to various embodiments can use multiple signal detectors on each filtered baseband signal (one for each PHY or PHY mode that is expected). If one of the signal detectors triggers, then the controller may select a demodulator suitable to demodulate the detected PHY (or PHY mode), and provide the associated filtered baseband signal to that demodulator. In other embodiments, instead of selecting a demodulator, a configurable demodulator may be configured to demodulate the detected PHY or PHY mode. If a certain frequency channel is dedicated to a single PHY or PHY mode (e.g. known a priori, per commissioning) then a single signal detector may be used on the associated filtered baseband signal.

In other exemplary embodiments, when multiple signal detectors trigger, the controller may use the soft detection outputs of the signal detectors to select a filtered baseband signal based on maximum likelihood or maximum correlation. In other exemplary embodiments, the RF receiver uses an analog down converter (e.g., low noise amplifier (LNA), in-phase and quadrature (IQ) mixer, programmable gain amplifier (PGA)) to apply a frequency shift to the plurality of frequency channels for producing a combined analog IF signal.

An IF analog to digital converter (IF-ADC) converts the combined analog IF signal to produce a combined digital IF signal. A plurality of digital down converters apply a set of frequency shifts to the combined digital IF signal to produce a plurality of baseband signals. A plurality of channel filters may filter the plurality of baseband signals to produce a plurality of filtered base bands. Note that a single ADC and front-end circuitry (RF mixer, etc.) are used in conjunction with multiple IF path circuits or branches, which results in less complexity, less cost, and less energy or power consumption.

To allow for increased flexibility, in some embodiments a real IF-ADC (as apposed to complex) is used. The real IF-ADC will pass on positive as well as negative frequencies, so that separate frequency channels can be received above and below the local oscillator (LO) frequency. The final frequency position of each individual frequency channel is made by its associated complex mixer and complex IF filter stage. In such cases, the IF-ADC bandwidth should accommodate the highest (|IFx|+0.5 BWx) of the various IF paths, as described below in connection with FIG. 3, where |IFx| is equal to the absolute value of the RF receive frequency minus the LO frequency, and BWx is the appropriate or required bandwidth for receiving a desired or transmitted signal (see FIG. 3).

In various embodiments, the RF receiver uses a plurality of digital mixer stages where each digital mixer is driven by a combined digital IF signal and a numerically controlled oscillator (NCO), each with its unique NCO frequency. The NCO frequency is equal to the IF frequency for that IF path or stage (IFx). Each digital mixer is followed by a filter stage. The filter stage may include a decimator, a finite impulse response (FIR) filter, an infinite impulse response (IIR) filter, a direct current (DC) filter, etc., as persons of ordinary skill in the art will understand.

In various embodiments, the circuitry or hardware of the RF receiver could be saved or reduced by sharing functions. For example, a second channel filter may share a multiplier with the first channel filter. As another example, the Look Up Table (LUT) for the sine/cosine generation in NCOs may be shared among the NCOs of the digital mixers.

As described below, RF receivers according to various embodiments include image reject calibration (IR-cal) circuitry. The IR-cal stage may be shared or separate IR-cal circuits may be used. Separate IR-cal stages or circuits may provide better image rejection because of frequency dependency in the IQ errors as caused by mismatches in a practical implementation of various circuits or blocks, such as mixers, PGAs, etc., and/or self-mixing in the mixer circuits, as persons of ordinary skill in the art will understand. Conversely, sharing the IR-cal circuits allows saving hardware, cost, etc., as discussed above.

In exemplary embodiments, the signal detectors used in the RF receiver are relatively simple signal detectors. Examples include correlators, cost function detectors, digital signal arrival (DSA) detectors, RSSI detectors, magnitude detectors, phase detectors, phase discriminators, differentiated phase detectors, etc., as persons of ordinary skill in the art will understand.

FIG. 1 shows a circuit arrangement for an RF receiver 5 according to an exemplary embodiment. The RF receiver 5 is coupled to an antenna 10, through which it receives RF signals. The received RF signals are fed to the LNA 15, which amplifies the received RF signals, and provides the amplified RF signals to the mixer 20 (labeled "RFMIX"). The mixer 20 mixes the amplified RF signals with an LO signal provided by the LO 25 to generate a mixed or down converted signal. The mixed signal is provided to the PGA 30. The PGA 30 amplifies the mixed signal, using a programmable gain, to generate an amplified mixed signal.

The ADC 35 receives the amplified mixed signal, an analog signal, and converts it to a digital mixed signal. The ADC 35 provides the digital mixed signal to the digital modem 40, which may filter, decode, demodulate, etc., the digital mixed signal to extract data and provide the data at its output. Note that the digital modem 40 may perform various functions, such as channel filtering, signal detection, and modulation, as described below. Furthermore, note that, although in some embodiments, the transmit (modulation) functionality may be omitted, the phrase digital modem is nevertheless used for the brevity of presentation.

In exemplary embodiments, the front-end circuitry, e.g., the LNA 15, the mixer 20, the LO 25, the PGA 30, and the ADC 35 are shared by the various IF branches or circuits in the digital modem 40, as noted above. The description below describes various digital modems 40 according to exemplary embodiments. Note that, although the figures and the accompanying description show two IF paths or circuits for the sake of brevity and clarity of presentation, in various embodiments more than two IF paths or circuits may be used, as persons of ordinary skill in the art will understand.

Figure 2:
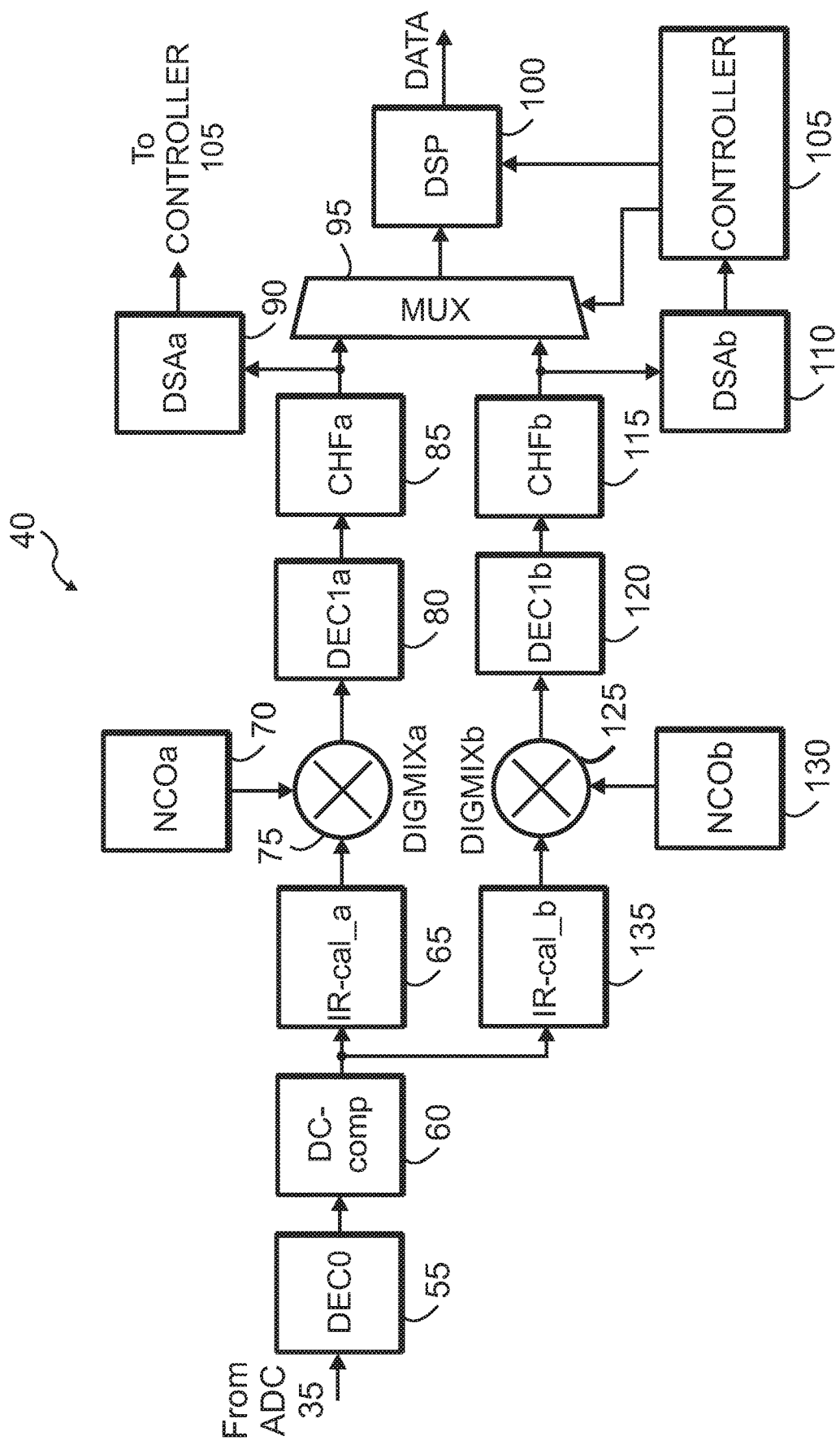
FIG. 2 shows a circuit arrangement for the digital modem of an RF receiver according to an exemplary embodiment.

FIG. 2 shows a circuit arrangement for the digital modem 40 of an RF receiver according to an exemplary embodiment. The output signal of the ADC 35 (see FIG. 1) is provided to the decimator 55 (labeled "DEC0"), which decimates the signal, and provides a decimated signal at its output. The output signal of the decimator 55 feeds the input of DC compensation circuit 60 (labeled "DC-comp"), which removes or attenuates or compensates for any DC component present in the decimated signal. The output of the DC compensation circuit 60 drives two IF path circuits, as described below.

In the first IF path circuit, the output of the DC compensation circuit 60 drives the input of the image-reject (IR) calibration circuit 65 (labeled "IR-cal_a"), which performs IR calibration, as persons of ordinary skill in the art will understand. The output of the IR calibration circuit 65 drives the input of digital mixer 75, which mixes that signal with the output signal of the NCO 70 (labeled "NCO a") to generate a mixed digital signal at the output of the digital mixer 75. The decimator 80 (labeled "DEC1a") receives and decimates the digital mixed signal, and provides the resulting decimated signal to the channel filter 85 (labeled "CHFa"). The channel filter 85 filters the decimated signal (e.g., low pass filtering), and provides the resulting filtered signal to the DSA 90.

The DSA 90 performs as a signal detector. Thus, the DSA 90 detects (or looks for or examines or waits for) the arrival of a desired or specified signal. If so detected, the DSA 90 provides a signal to the controller 105 to indicate the signal arrival. In response, the controller 105 provides a select signal to the multiplexer (MUX) 95 to cause the MUX 95 to provide the output of the channel filter 85 to the digital signal processor (DSP) 100 or, generally, to one or more demodulators.

Thus, reference to the DSP 100 includes the use of one or more demodulators in various embodiments. The controller 105 also programs or configures or sets the DSP 100 for the detected type of signal, PHY, PHY mode, etc. In response, the DSP 100 extract the data from the packet in the output signal of the channel filter 85, which triggered the DSA 90, and provides the data at an output.

The second IF path circuit is similar to, and operates in a similar manner, to the first IF path circuit. Various blocks in the second IF path circuit use a notation "b" in their labeling, as opposed to "a" for the first IF path circuit (e.g., "IR-cal_b" instead of "IR-cal_a" for the first IF path circuit. Thus, the second IF path circuit includes the IR calibration circuit 135 (labeled "IR-cal_b"), the NCO 130 (labeled "NCO b"), the decimator 120 (labeled "DEC1b"), the channel filter 115 (labeled "CHFa"), and the DSA 110 (labeled "DSAb").

If the DSA 110 detects the arrival of a desired or signal through the second IF path circuit, i.e., in the output signal of the channel filter 115, it provides an indication of the signal arrival to the controller 105. In response, the controller 105 provides a select signal to the MUX 95 to cause the MUX 95 to provide the output of the channel filter 110 to the DSP 100.

The controller 105 also programs or configures or sets the DSP 100 for the detected type of signal, PHY, PHY mode, etc. In response, the DSP 100 extracts the data from the packet in the output signal of the channel filter 115, which triggered the DSA 110, and provides the data at an output. Thus, the RF receiver is capable of simultaneously detecting multiple PHYs or PHY modes or signals in multiple frequency channels.

Note that the NCOs of the first and second IF path circuits have output frequencies that correspond to the two frequency channels on which the respective IF path circuits operate. In exemplary embodiments, the controller 105 may set, program, or configure the output frequencies of the NCO 70 and the NCO 130. Note further that, as described above, in some embodiments, more than two IF path circuits may be used, depending on the number of frequency channels that one desires to scan simultaneously. In addition, note that, in some embodiments, the DSA 90 and the DSA 110 may be programmed to receive the same PHY or PHY mode, but at different frequencies, as desired.

Figure 3:
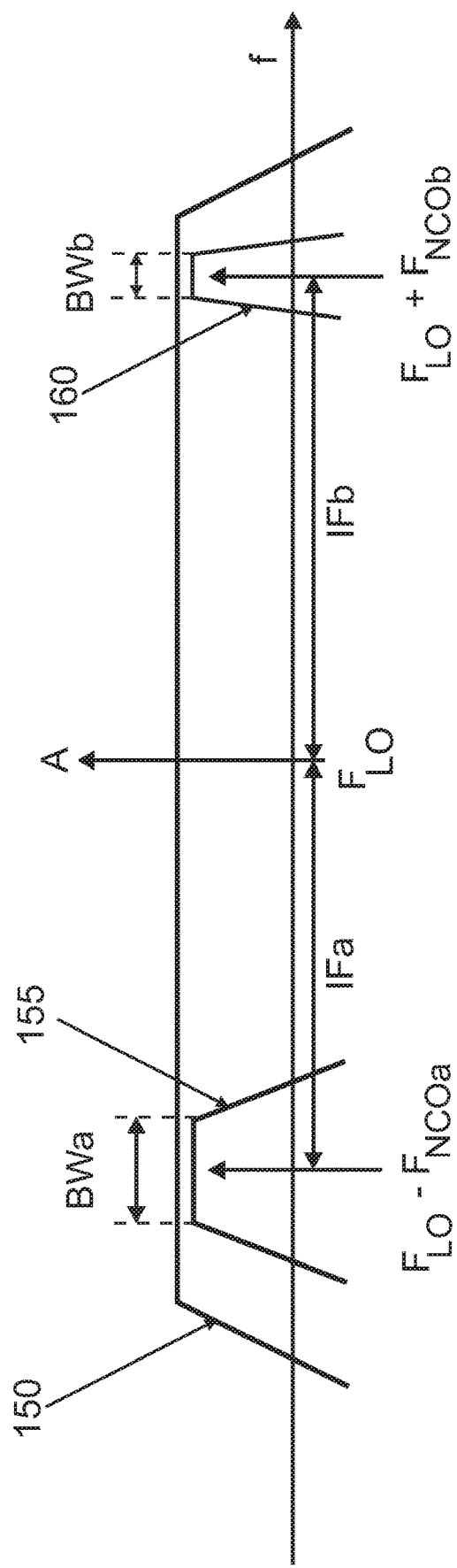
FIG. 3 shows plots of frequency responses in an RF receiver according to an exemplary embodiment.

FIG. 3 shows plots of frequency responses in an RF receiver according to an exemplary embodiment. More specifically, the plot shows the frequency response 150 of the decimator 55, the frequency channel 155 (formed by the frequency responses of the digital mixer 75, the decimator 80, and the channel filter 85) (labeled as "BWa"). The frequency channel 155 is centered at the frequency ($F_{LO}$-$F_{NCOa}$), where $F_{LO}$ and $F_{NCOa}$ denote the output frequencies of the LO 25 and the NCO 70, respectively.

Similarly, FIG. 3 shows the channel 160 (formed by the frequency responses of the digital mixer 125, the decimator 120, and the channel filter 115) (labeled as "BWb"). The frequency channel 160 is centered at the frequency ($F_{LU}$+ $F_{NCOb}$), where $F_{LO}$ and $F_{NCO0}$ denote the output frequencies of the LO 25 and the NCO 130, respectively. Note that the plot also shows the IF frequencies of the two IF path circuits. They are denoted as $IF_a$ and $IF_b$, respectively.

Figure 4:
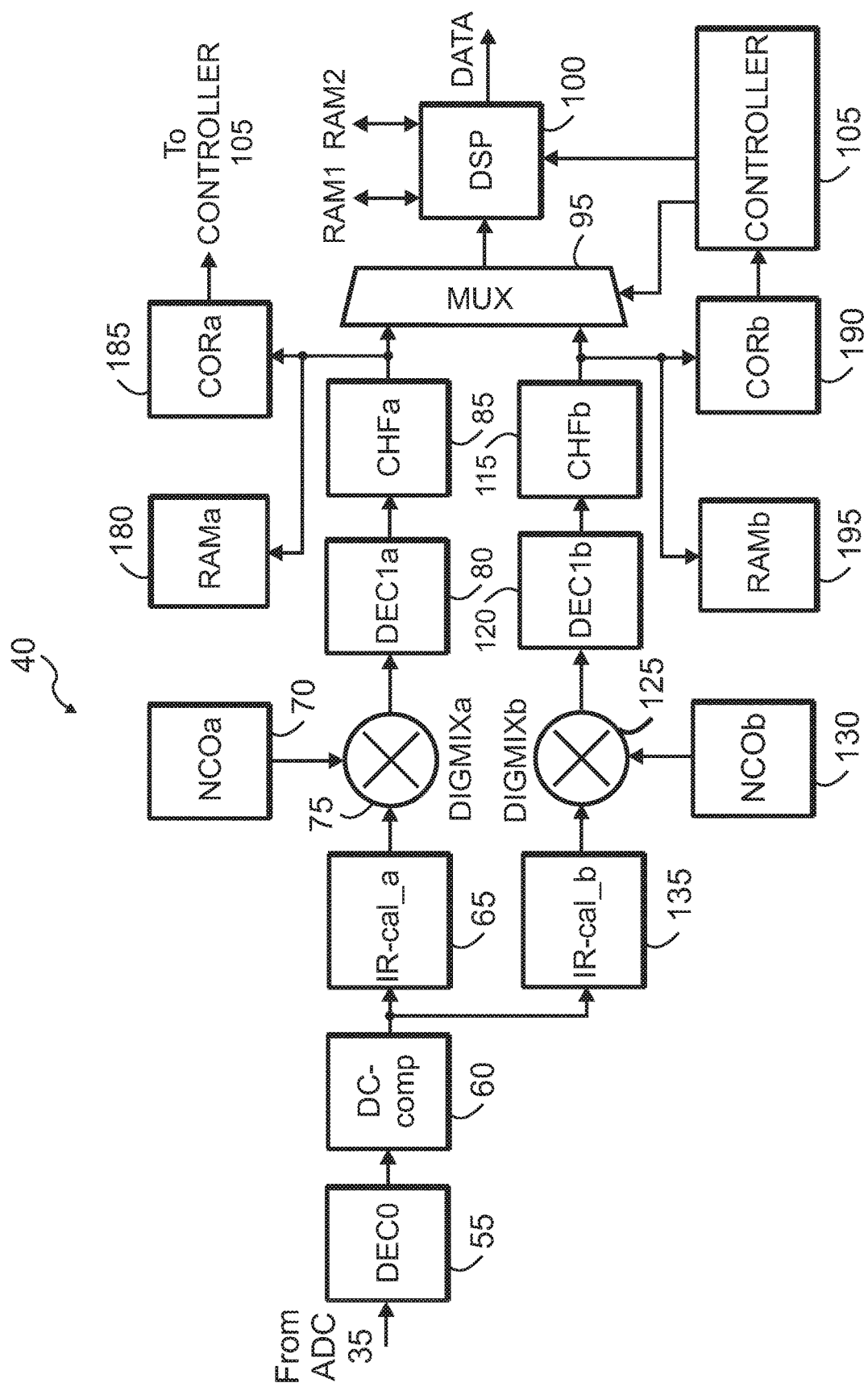
FIG. 4 shows a circuit arrangement for the digital modem of an RF receiver according to an exemplary embodiment.

FIG. 4 shows a circuit arrangement for the digital modem 40 of an RF receiver according to an exemplary embodiment. The circuit arrangement in FIG. 4 is similar to the circuit arrangement in FIG. 2, except that the output of the channel filter 85 drives the inputs of the random access memory 180 (labeled "RAMa") and the correlator 185 (labeled "COR a"), and the output of the channel filter 115 drives the inputs of the RAM 195 (labeled "RAMb") and the correlator 190 (labeled "COR b"). RAM1 and RAM2 denote memories that the DSP 100 may use to perform its functions (e.g., demodulation), for example, as scratch pad memory, etc.

The samples (IQ or phase or magnitude or a combination) are stored in circular buffers formed by the RAM 180 and the RAM 195. In this circuit, the RF receiver the correlator 190 may detect a correlation peak while processing a-sync-h sync (synchronization) word for sync_word_a. Then, the DSP 100 can "rewind" through the data, using the RAM 195, to the sync word, and apply forward error correction (FEC) decoding followed by sync word demodulation (e.g., as in BLE coded PHY or PHY mode).

Note that a combination of the detector circuitries shown in FIGS. 2 and 4 may be used. Thus, in some embodiments, one or more of the IF paths use DSA(s), while one or more of the IF paths use the combination of RAM(s) and correlator(s). Furthermore, rather than using the RAM 180 and the RAM 195, a single RAM with dual ports may be used in some embodiments, in which case one port receives the output of the channel filter 85 and another port receives the output of the channel filter 115.

Figure 5:
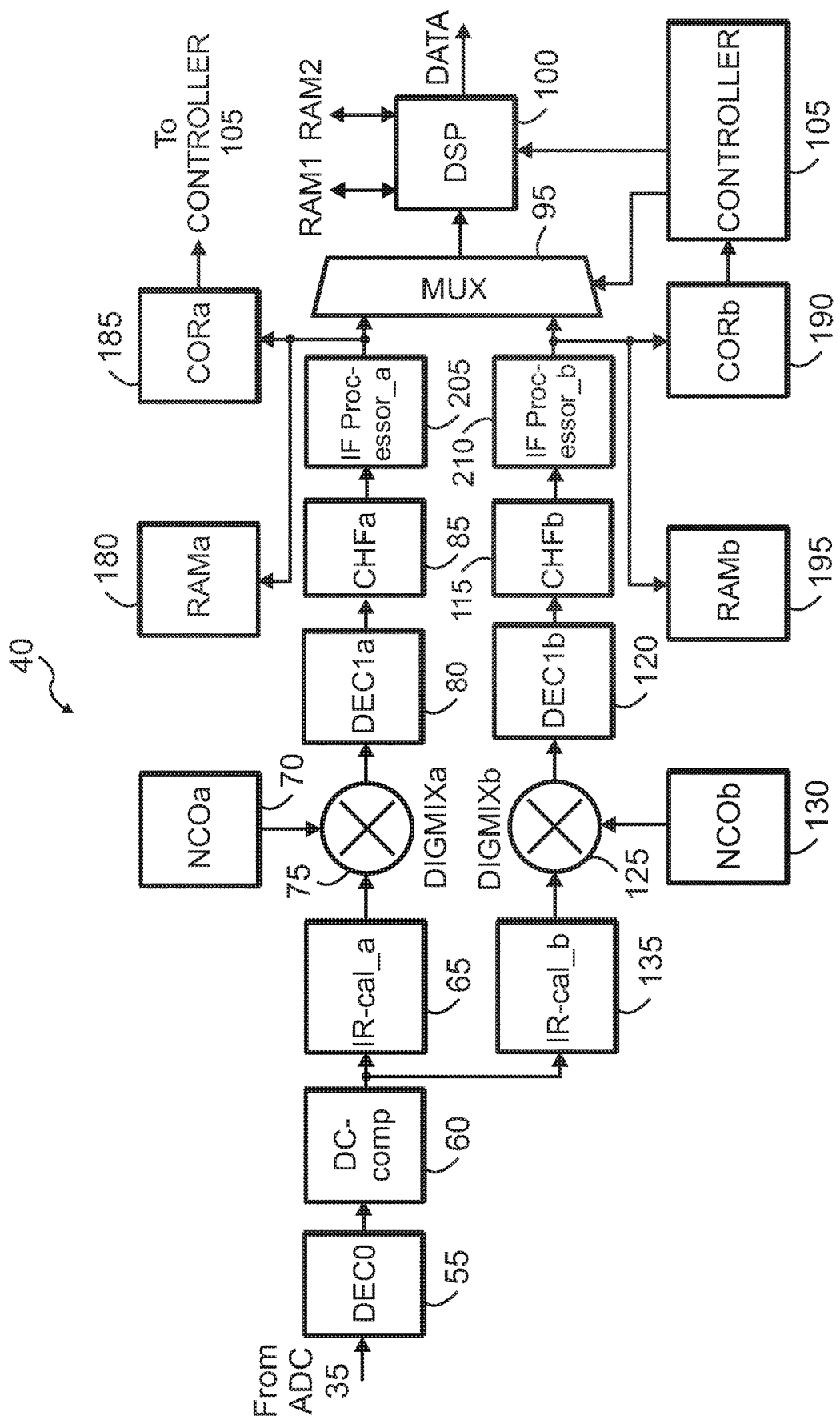
FIG. 5 shows a circuit arrangement for the digital modem of an RF receiver according to an exemplary embodiment.

FIG. 5 shows a circuit arrangement for the digital modem 40 of an RF receiver according to an exemplary embodiment. The circuit arrangement in FIG. 5 is similar to the circuit arrangement in FIG. 4, except that the output of the channel filter 85 does not drive the RAM 180 and the correlator 185, but instead drives the input of the IF processor circuit 205 (labeled "IF processor_a"). The output of the IF processor 205 drives the inputs of the RAM 180 and the correlator 185. Similarly, the output of the channel filter 115 does not drive the RAM 190 and the correlator 190, but instead drives the input of the IF processor circuit 210 (labeled "IF processor b"). The output of the IF processor 210 drives the inputs of the RAM 195 and the correlator 190.

In exemplary embodiments, the IF processors 205 and 210 may each be a coordinate rotation digital computer (CORDIC) or any other Cartesian-to-Polar converter circuit. Each of the IF processors 205 and 210 may also be build using a CORDIC followed by a phase differentiator, where differentiation may be oversampled (multiple differentiations per symbol) or one differentiation per symbol may be used. It is also possible that the IF processors 205 and 210 may provides magnitude or logarithmic magnitude for amplitude shift keying (ASK) or on-off keying (OOK) applications.

In addition, the IF processors 205 and 210 could be extended with a slicer to slice raw magnitude, phase, or differentiated phase to 1 or 0 values. Furthermore, a combination of the detector circuitries shown in FIGS. 2 and 4 may be used. Thus, in some embodiments, one or more of the IF paths may use an IF processor, while one or more of the IF paths may use any of the signal detectors described above (e.g., DSA).

Figure 6:
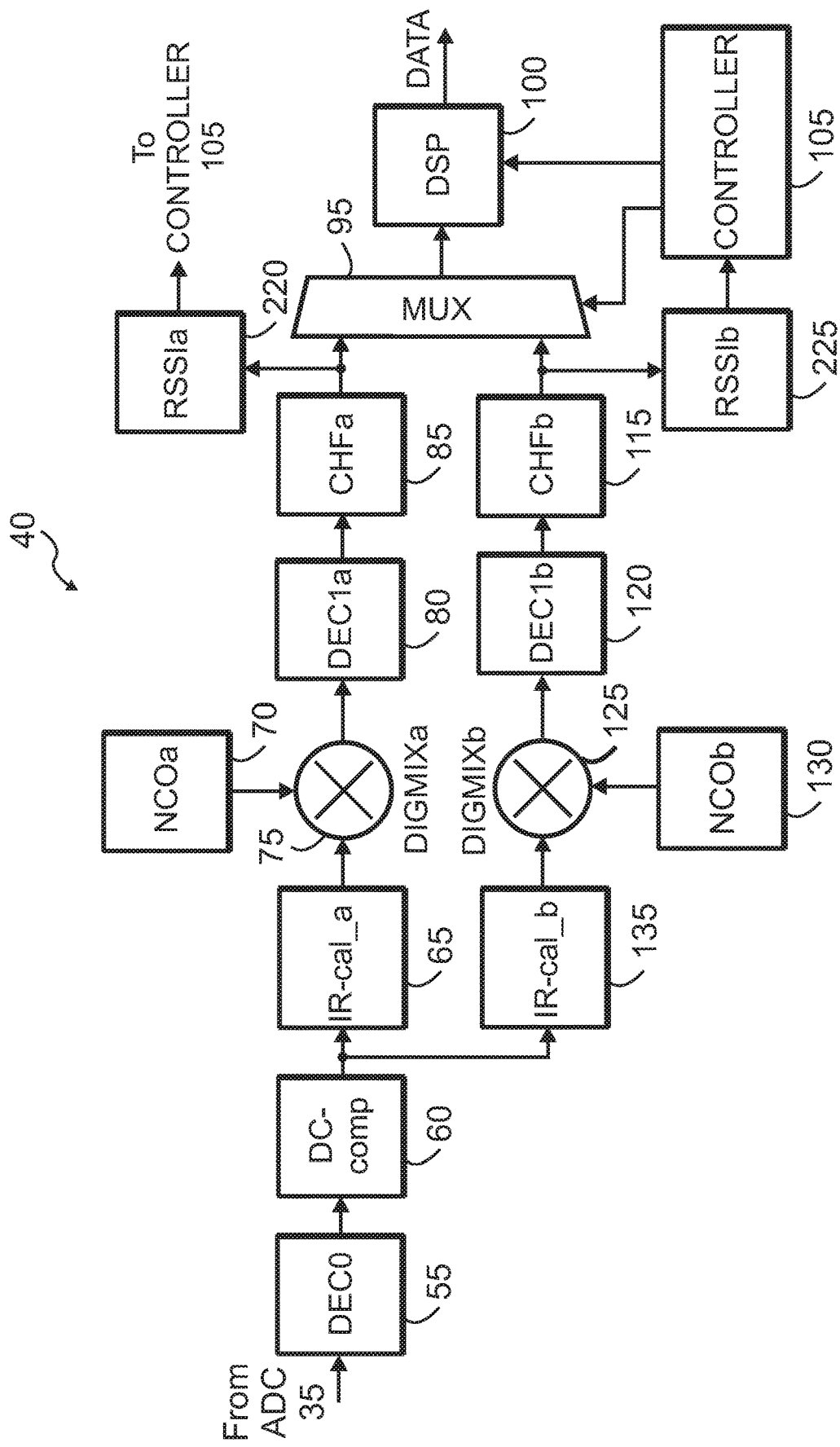
FIG. 6 shows a circuit arrangement for the digital modem of an RF receiver according to an exemplary embodiment.

FIG. 6 shows a circuit arrangement for the digital modem 40 of an RF receiver according to an exemplary embodiment. The circuit arrangement in FIG. 6 is similar to the circuit arrangement in FIG. 2, except that the output of the channel filter 85 drives the input of the RSSI circuit 220 (labeled "RSSI a"), and the output of the channel filter 115 drives the input of the RSSI circuit 225 (labeled "RSSI b"). The RSSI circuit in each of the IP path circuits extracts the signal level (RSSI, magnitude, energy detect (ED) or RMS level) from the respective channel filter output.

The signal level can be assessed on multiple frequency channels simultaneously by using the multiple IF path circuits, thus speeding up RSSI scanning. The signal levels are conveyed to the controller 105 for processing. The controller 105 then controls the MUX 95, as described above in connection with FIG. 2. In some embodiments, the controller 105 may include memory where signal levels are stored. Applications of the embodiment in FIG. 6 include: signal level scanning for frequency agility (link), listen before talk, and fast spectrum analyzer.

Figure 7:
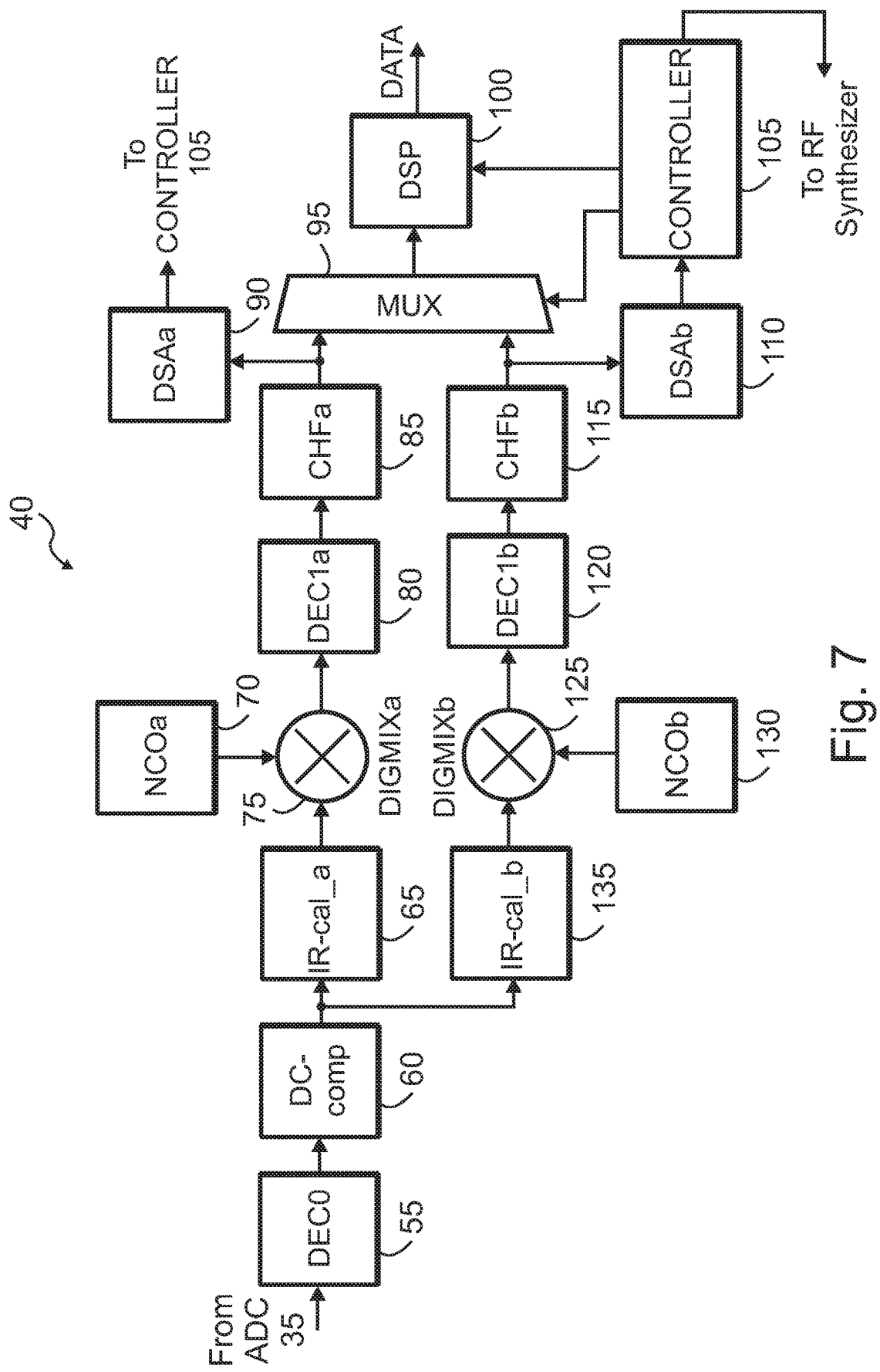
FIG. 7 shows a circuit arrangement for the digital modem of an RF receiver according to an exemplary embodiment.
Figure 8:
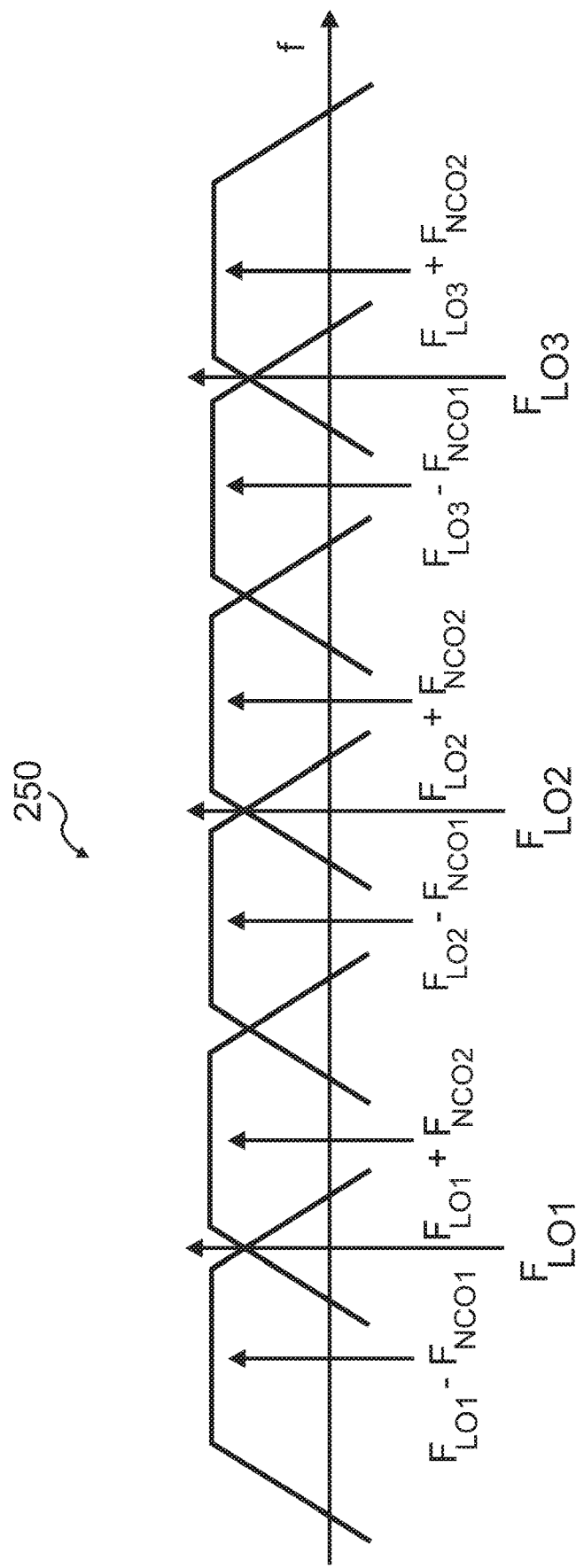
FIG. 8 shows plots of frequency responses in an RF receiver according to an exemplary embodiment.

FIG. 7 shows a circuit arrangement for the digital modem 40 of an RF receiver according to an exemplary embodiment. The circuit arrangement in FIG. 7 is similar to the embodiment shown in FIG. 2, except that in the embodiment of FIG. 7, the controller 105 drives an RF synthesizer. The RF synthesizer changes output frequency if the number of frequencies that should be or are desired to scan is more than the number of IF path circuits in the RF receiver. For instance, if the RF receiver has two IF path circuits and 20 channels are desired to have RSSI assessment performed, then the RF synthesizer should be tuned on 10 frequencies. As an example, FIG. 8 shows 6 channels being assessed using three RF synthesizer (LO) frequencies.

Note that the receiver in FIG. 7 may also use any other detection architectures, such as those described above (e.g., DSA, IF processor, etc.). In embodiments where two DSAs or correlators are used, and neither detects a signal a certain time window, then the controller will cause the LO frequency to change to a next frequency value to evaluate again. Alternatively, the controller may change the frequencies of the NCOs. In such embodiments, the scanning can be put on hold as soon as any of the DSAs or correlators triggers, i.e., detects a signal.

The DSA or correlator that triggers first causes the controller 105 to select the MUX 95 to convey the associated channel filter output to the DSP 100, and configures the DSP 100 according to the detected signal, PHY, or PHY mode, as described above. The DSP 100 extracts the data from the packet at which the DSA triggered. In case both DSAs or correlators trigger at the same time, the highest correlation result could be used to select the channel from which the DSP 100 extracts the data. Alternatively, a priority scheme could be used so that a specific PHY will get priority to be demodulated first whenever both correlators or DSAs trigger at the same time. In addition, the DSA or TRECS (Timing RECovery System) could also extract the residual frequency offset to improve alignment by adjusting the LO or NCO frequencies.

Once the modulation is aligned in one of the channel filters, that channel filter's bandwidth may be reduced to gain sensitivity, reduce noise, and improve channel selectivity. As persons of ordinary skill in the art will understand, adding more IF path circuits (simultaneous receive channels) speeds up scanning AFC systems.

FIG. 8 shows plots of frequency responses in an RF receiver according to an exemplary embodiment that uses two IF path circuits. When no valid signal is received, the LO may scan from $F_{LO2}$ to $F_{LO3}$ to $F_{LO1}$ to $F_{LO2}$, etc. When a valid signal is received in the channel, $F_{LO3}+F_{NCO2}$, the LO scanning will stop at $F_{LO3}$, and the DSP 100 will start demodulating the signal in the second IF path circuit. As noted above, the scanning time can be further reduced by using more IF path circuits.

Figure 9:
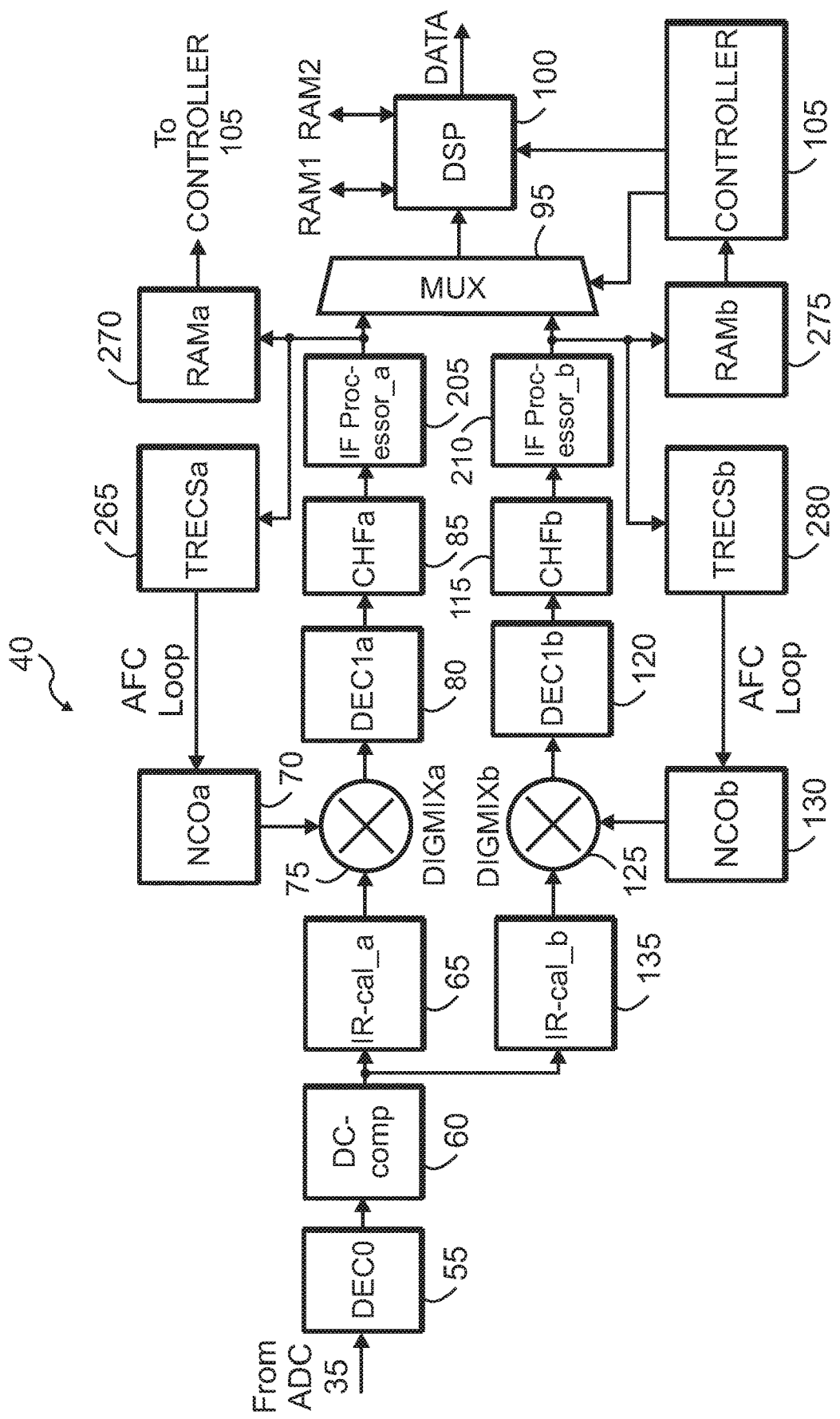
FIG. 9 shows a circuit arrangement for the digital modem of an RF receiver according to an exemplary embodiment.

FIG. 9 shows a circuit arrangement for the digital modem 40 of an RF receiver according to an exemplary embodiment. The circuit arrangement in FIG. 9 is similar to the circuit arrangement in FIG. 5, in that the IF processors 205 and 210 are used, as described above. In contrast to the embodiment in FIG. 5, in the embodiment in FIG. 9, the output of the IF processor 205 drives the inputs of the RAM 270 (labeled "RAM a") and the TRECS 265 (labeled "TRECS a"). Similarly, the output of the IF processor 210 drives the input of the RAM 275 (labeled "RAM b") and the TRECS 280 (labeled "TRECS b").

Each of the TRECS 265 and 280 finds timing (on preamble, sync word, or a combination of the two). When timing is found in an IF path circuit, the corresponding TRECS also has an estimate of the frequency offset. This frequency offset estimate can be provided to the respective NCO in the IF path circuit to align the modulated spectrum in the center of the channel filter bandwidth. The output of TRECS 265 forms an AFC loop in the first IF path circuit by supplying a frequency offset signal to the NCO 70.

Similarly, the output of TRECS 280 forms an AFC loop in the second IF path circuit by supplying a frequency offset signal to the NCO 130. The frequency offset signals are used to trim or adjust or program or set or configure the respective frequencies of the NCO 70 and of the NCO 130 to align the modulated signal in the center of the channel filter bandwidth, as described above.

Another aspect of the disclosure relates to concurrent signal detection in RF receivers by using multiple signal detectors. Generally speaking, RF receivers according to various embodiments provide concurrent detection of patterns (or detection of patterns in signals). The patterns may include preamble, synchronization word (sync word), or both. Thus, in various embodiments, concurrent pattern detection constitutes concurrent preamble detection, concurrent sync word detection, and/or concurrent preamble and sync word detection. Without loss of generality, the description below may refer to preamble detection, sync word detection, or both. In other words, as noted, the patterns generally include preamble(s), sync word(s), and/or both. Thus, references to preamble detection or preamble detector in the description may be generalized or applied to patterns or pattern detection generally, as persons of ordinary skill in the art will understand. Similarly, references to sync word detection or sync word in the description may be generalized or applied to patterns or pattern detection generally, as persons of ordinary skill in the art will understand.

Figure 10:
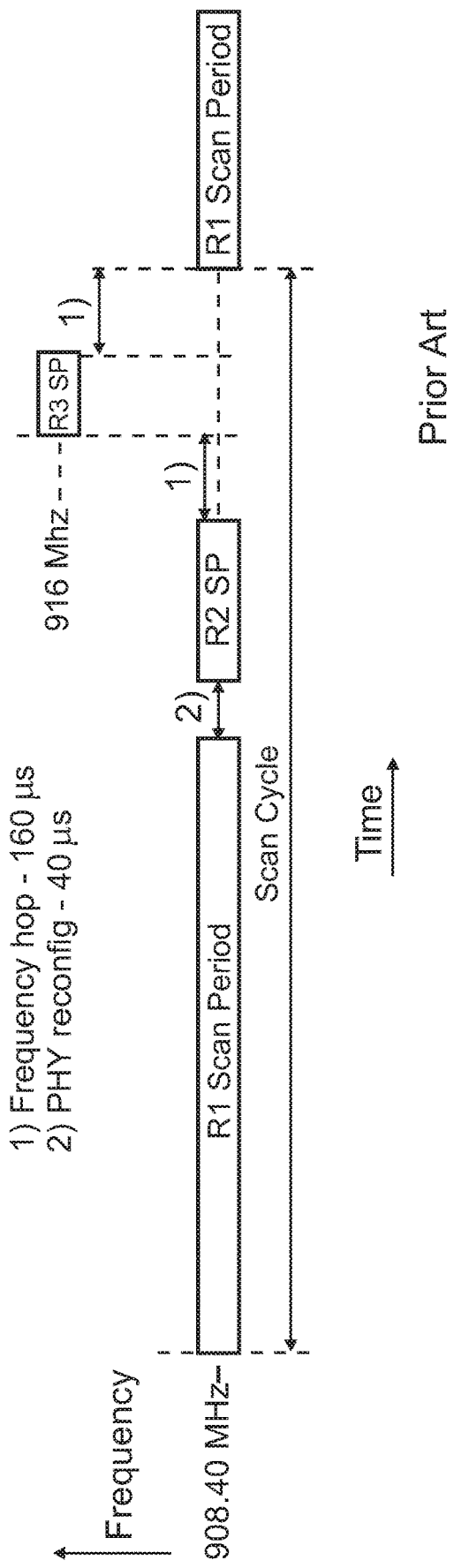
FIG. 10 shows scanning in a conventional receiver.

FIG. 10 shows scanning in a conventional receiver. The scanning corresponds to Z-wave, which may have 3 PHY types: R1, R2, and R3 (e.g., in Federal Communications Commission (FCC) regions). R1 and R2 transmit at around 908.4 MHz, while R3 transmits at a different frequency, 916 MHz.

The Z-wave specification (available currently at https://www.itu.int/rec/T-REC-G.9959-201501-I) specifies at clause 7.1.2.2 three PHYs: R1, R2 and R3. In channel configuration 2, all three PHYs can be used. The preamble for these PHYs are specified in clause 7.1.3.2, which states: "The preamble length shall comply with Table 7-10. The values allow a receiver to scan all channels and obtain synchronization at an arbitrary channel during the duration of the preamble." The specifications imply sequential scanning of all three PHYs when channel configuration 2 is used. The challenge for the receiver is to find the preamble within the available preamble length for all three PHY possibilities.

The receiver may not have a priori knowledge about which PHY type is transmitted (to which PHY type the transmitted signal corresponds). As a result, the receiver has to scan the three PHY types so that that it can perform preamble detection during a single preamble transmission. The preambles lengths are just long enough to support this scheme while maintaining an acceptable battery life.

In FIG. 10, the receiver performs a sequential cyclic scanning loop, as illustrated. The preamble detection window in terms of symbols is about the same to have a balanced performance. Longer detection window will reduce false detects and improve detection sensitivity, as persons of ordinary skill in the art understand. In the timing diagram of receiver scanning shown in FIG. 10, the scan periods are proportional to the data rate (R1=9.6 kbps, R2=40 kbps and R3=100 kbps), and are performed sequentially, as noted above.

In Z-wave, the specifications call for preamble detection during the duration of the transmitted preamble. Accordingly, the preamble is longer than a certain length to support the specification. A scan period typically constitutes the period where the receiver is on (powered on) to detect a certain period. Typically, the scan period is the sum of automatic gain control (AGC) settling time, the group delay from the antenna to the preamble detector, the receiver settling time (e.g., the AFC loop settling time), the asynchronous delay (the phase of the incoming preamble could be inverted to the correlator in the preamble detector), and the detection window (the evaluation time for the signal detector or preamble detector to detect the PHY sequence). As persons of ordinary skill in the art understand, a relatively long detection windows is desirable, however, the scan periods (SPs) are limited by the preamble length.

As noted, Z-wave receivers operating according to the Z-wave specification scan multiple PHYs (scan for received signals corresponding to the multiple PHYs), e.g. R1, R2, and R3. Expressed in terms of time, the R2 PHY has the shortest preamble. As noted above, conventional solutions configure the receiver to scan for preambles sequentially. The preambles of all PHYs are fairly long so that the sequentially scanning receiver should never be missing a packet. However, Z-wave provides for the introduction of an additional PHY for long-range communication. Scanning for four PHYs might become problematic because the preamble lengths of the legacy PHYs cannot be changed. Scanning sequentially would mean speeding up the scan periods, which means that the length of the preamble correlator would have to be reduced. Doing so, however, gives rise to an elevated packet error rate floor, sensitivity loss, and a reduced robustness against interference.

RF receivers according to various embodiments support concurrent signal detection, i.e., concurrent preamble detection, by using a plurality of signal detectors (e.g., preamble detectors). A typical application for such receivers would be a communication system that uses multiple PHYs, where the receiver does not have prior (a priori) knowledge which PHY is being transmitted. As noted above, Z-wave specifies this scheme. In RF receivers according to various embodiments, to increase the communication range, an additional PHY to support long-range applications (e.g., in regions or countries that comply with FCC regulations. Scanning for four possible PHYs (signals transmitted by the corresponding PHYs) is even more challenging than scanning for three PHYs.

RF receivers according to various embodiments take advantage of the fact that the R1 and R2 PHYs share the same channel to concurrently scan the R1 and R2 PHYs (scan the received RF signals corresponding to the two respective PHYs). RF receivers according to various embodiments feature increased receive sensitivity, lowered packet error rate floor, and increased robustness against interference.

Although the discussion below refers to the use of receivers according to various embodiments in systems using Z-wave, use of receivers according to various embodiments is contemplated and possible in systems with specifications other than Z-wave by making appropriate modifications, as persons of ordinary skill in the art will understand. The references to Z-wave, the corresponding description, and the receiver architectures and circuit arrangements are therefore merely exemplary, and not limiting.

In various embodiments, a concurrent scanning RF receiver architecture or a partly concurrent and party sequential scanning RF receiver architecture is used. To reduce the power consumption and cost of the receiver, the channel filter and all of the circuitry in front of the channel filter (i.e., between the antenna interface and the channel filter, like the LNA, RF mixer, frequency synthesizer, PGA, ADC, AGC loop, decimators, and digital mixer), collectively the front-end circuitry (or front-end circuit), are shared, as described below. Note that the embodiments described and shown in the figures are merely illustrative and exemplary, as persons of ordinary skill in the art will understand. Other embodiments are contemplated and possible, as persons of ordinary skill in the art will understand. For example, in some embodiments, the channel filter, the digital mixer, and/or the decimators may not be shared, as desired.

In some embodiments, during the concurrent preamble search, a single channel filter is used for all PHYs that use concurrent preamble search. In such embodiments, the channel filter bandwidth is configured (or set or programmed) to the bandwidth specifications of the PHY that has the highest bandwidth specified so that the channel filter can pass the signals for all PHYs for concurrent preamble search.

In some embodiments, the above scheme is extended, and multiple preamble detectors are used to support concurrent preamble search. Each preamble detector is configured to one of the PHYs used in the concurrent preamble search so that a preamble detection can be linked to the PHY being received (i.e., the PHY to which a received RF signal corresponds). This scheme allows for PHY specific optimization in the receiver.

Examples of the receiver optimization are: (1) AFC settings, (2) channel filter bandwidth, (3) sample rate converter ratio, (4) demodulator configuration, (5) decoder settings (e.g., Manchester/not-return-to-zero (NRZ), de-interleaving, data de-whitening, and FEC engine), (6) additional preamble detection, and (7) sync word detection configuration. Each of the optimizations is described below, and one or more optimizations may be used with the exemplary receiver architectures shown in the figures and described below in detail.

(1) AFC settings: To minimize delay, the frequency error is measured during preamble search so that when the preamble is detected, the frequency error is readily available. When one of the preamble detectors is finding a preamble, then frequency correction is applied to align the incoming signal close the channel center frequency. The alignment can be accomplished by changing either the RF local oscillator or the oscillator driving the digital mixer. The AFC may use a parameter (AFC limit) to adjust the maximum amount of frequency offset compensation to prevent excessive tuning by inaccurate measurements. Since different PHYs may have different AFC limits, performance may be optimized by adjusting the AFC limit according to the PHY found by the preamble detector (the PHY corresponding to the received RF signal for which a preamble is detected).

(2) Channel filter bandwidth: Since different PHYs may have different modulation bandwidth and frequency offset range, performance may be optimized by adjusting the channel filter bandwidth according to the PHY found by the preamble detector. Narrower bandwidths may be selected according to the PHY found by the preamble detector, after the AFC is settled, which will improve receive sensitivity and selectivity. The channel filter bandwidth is usually determined by the filter sample rate and the channel filter coefficients. In some embodiments, the filter coefficients are changed so that the sample rate used by subsequent or follow-on circuitry stay unchanged.

(3) Sample Rate Converter ratio: Some PHYs may use a sample rate adjustment for further detection, after the preamble of such PHYs is detected (the PHY corresponding to the received RF signal for which a preamble is detected). Further detection may entail detection of the preamble, sync word, payload data, etc.

(4) Demodulator configuration: The preamble detectors may be separate blocks without using demodulator circuitry, as desired. In such embodiments, a demodulator would be enabled, or configured, according to the PHY found by the corresponding preamble detector.

(5) Decoder settings: To keep the cost low or to reduce cost (minimum or reduced die area), a single decoder may be used. To support such a configuration, the decoder may be adjusted according to the PHY found by the preamble detector. Decoding may entail, for example, Manchester/NRZ decoding, de-interleaving, de-whitening, forward error correction, block decoding, etc.

(6) Additional preamble detection: After the preamble is detected initially, as part of the concurrent PHY detection, additional detection may be employed to improve the overall preamble detection reliability. For example, a preamble detector may be configured according to the PHY found by the initial preamble detector.

(7) Sync word detection configuration: If two or more PHYs share sync word detection circuitry, then this circuitry can be configured according to the PHY found by the preamble detector.

As noted, in various embodiments, the above optimizations may be used singly, i.e., each optimization by itself, or multiple optimizations may be used together. In addition, or instead, in some embodiments, multi-channel reception may be supported or used. More specifically, by combining concurrent preamble detection with the multi-channel reception techniques described above (as detailed in the priority U.S. patent application Ser. No. 16/668,834 referenced above), as desired.

More specifically, every IF-path may have at least one detector to detect a preamble or a synchronization (or sync) word. If a preamble or synchronization word is detected, then optimizations could be performed in the same way as described above. For example, in the IF path corresponding to the detection, the oscillator driving the digital mixer could be tuned to compensate for frequency offset, and the channel filter bandwidth could be narrowed to improve sensitivity and selectivity performance. In addition, the other IF path(s) could be shut down (or disabled or powered down) to reduce power consumption. All other optimizations described in this document may also be applied in a multi-channel configuration, as desired.

The following description provides RF receiver architectures, flow diagrams, and associated plots corresponding to concurrent detection according to various embodiments. The RF receivers may use any of the optimizations described above. Furthermore, the RF receivers may use the techniques described above to implement and use multi-channel reception, as desired.

The RF receivers use some of the blocks or circuitry (e.g., the LNA 15, the mixer 20, the PGA 30, the ADC 35, the decimator 35, etc.) used in previous figures (e.g., FIGS. 1-2, 4-7, and 9), described above. The blocks or circuitry provide functionality and features similar to those described above in connection with FIGS. 1-9. Accordingly, the description of such blocks or circuitry is not repeated below.

Figure 11:
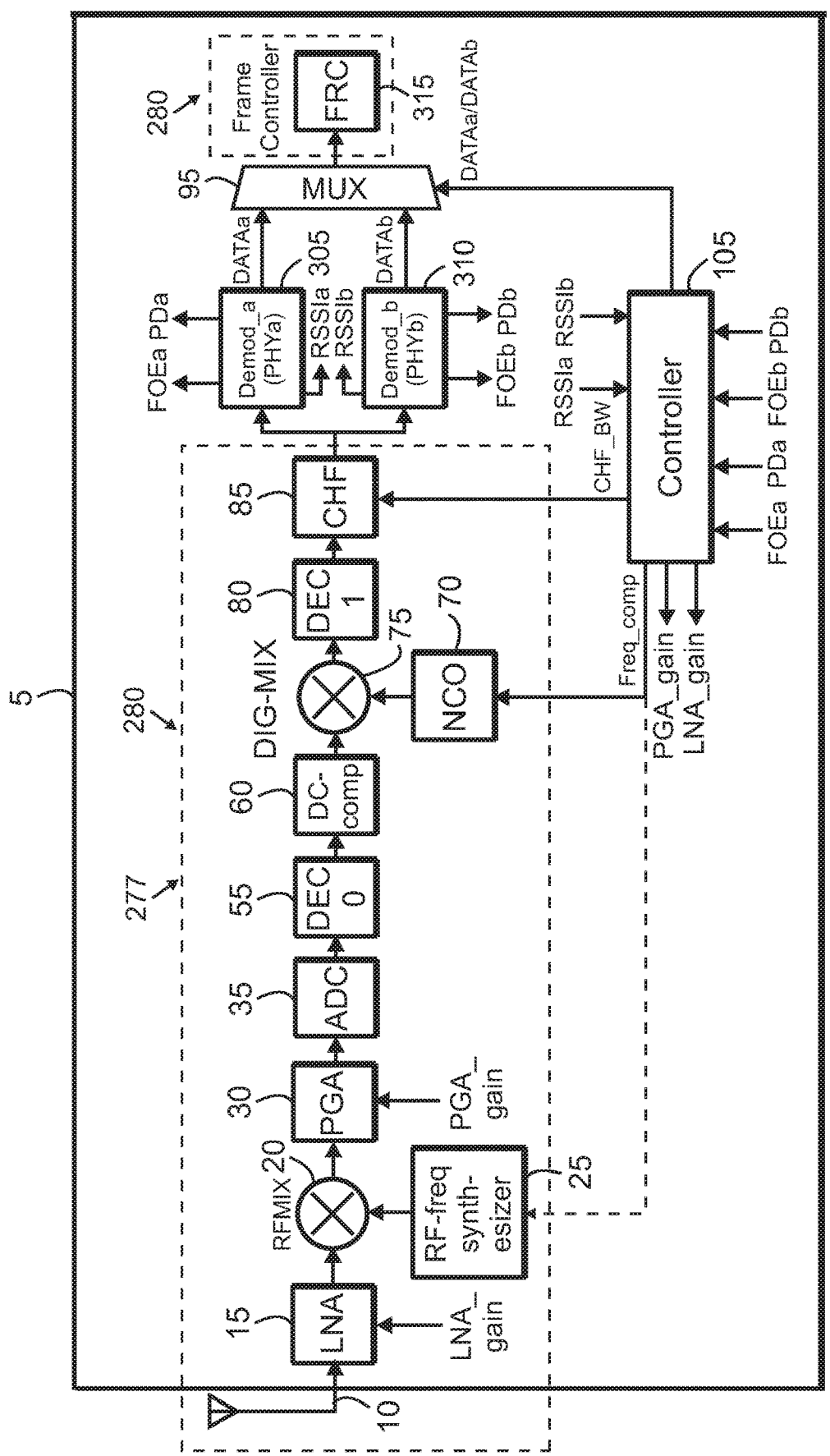
FIG. 11 shows a circuit arrangement for an RF receiver according to an exemplary embodiment.

FIG. 11 shows a circuit arrangement for an RF receiver 5 according to an exemplary embodiment that supports concurrent detection. The RF receiver 5 includes front-end circuitry 277. In the embodiment shown, the front-end circuitry 277 includes the LNA 15 (which receives a gain adjustment signal LNA_gain from the controller 105), the mixer 20, the RF frequency synthesizer (LO) 25, the PGA 30 (which receives a gain adjust signal PGA_gain from the controller 105), the ADC 35, the decimator 55, the DC compensation circuit 60, the digital mixer 75, the decimator 80, the channel filter 85, and the NCO 70.

In order to reduce power consumption, cost, and complexity, certain blocks or circuitry in the RF receiver 5 are shared among the various PHYs. In the figure, the shared blocks or circuitry (or hardware (which might include or use firmware or software) are labeled 280. Thus, note that, in addition to the front-end circuitry 277, the shared circuitry 280 also includes the frame controller circuitry (FRC) 315.

The output of the channel filter 85 is provided to the demodulator 305 (labeled "Demod_a (PHYa)" and corresponding to a first PHY) and the demodulator 310 (labeled "Demod_b (PHYb)" and corresponding to a second PHY). The demodulator 305 and the demodulator 310 are used for concurrent preamble and/or synchronization word detection of the two respective PHYs.

Several techniques know to persons of ordinary skill in the art may be used to detect preamble and/or synchronization word. A straightforward method to detect preamble and/or synchronization word may be by demodulating the signal and performing a binary comparison between a predefined sequence and the demodulated output. When a match occurs, with no errors or a relatively few errors, then the sequence could be considered detected. Examples of more elaborate detection methods are described in U.S. patent application Ser. No. 15/370,674, filed on Dec. 6, 2016, titled "Radio-Frequency Apparatus with Digital Signal Arrival Detection and Associated Methods," and U.S. patent application Ser. No. 16/177,373, filed on Oct. 31, 2018, titled "Apparatus for Radio Frequency Receiver with Improved Timing Recovery and Frequency Offset Estimation and Associated Methods."

The demodulator 305 provides signals FOEa (the frequency offset estimate from Demod_a, corresponding to PHYa) and PDa (preamble detect signal from Demod_a) to the controller 105. Similarly, the demodulator 310 provides signals FOEb (the frequency offset estimate from Demod_b, corresponding to PHYb) and PDb (preamble detect signal from Demod_b) to the controller 105.

In response to the FOEa and FOEb signals, the controller 105 generates the frequency compensation signal (Freq_comp), depending on which demodulator detected the preamble (i.e., whether the demodulator 305, corresponding to FOEa, or the demodulator 310, corresponding to FOEb, detected the preamble), which is used to set the output frequency of the NCO 70, and/or the output frequency of the RF frequency synthesizer 25. The signals PDa and PDb are used to denote preamble detection by the demodulator 305 and the demodulator 310, respectively.

The demodulator 305 also generates and provides to the controller 105 an RSSIa signal, which denotes the RSSI of the signal processed by the demodulator 305. Similarly, the demodulator 310 generates and provides to the controller 105 an RSSIb signal, which denotes the RSSI of the signal processed by the demodulator 310. The RSSIa and RSSIb signals are used, respectively, to set the gains of the LNA 15 and the PGA 30, depending on which demodulator detected the preamble (i.e., whether the demodulator 305, corresponding to RSSIa, or the demodulator 310, corresponding to RSSIb, detected the preamble). The RSSI (or power level) signals are typically obtained after the channel filter, indicating the in-band power level. When RSSI exceeds the level where reliable detection is possible, i.e., the RSSI exceeds the detection level, then the gain in the front-end circuitry 277 may be reduced while still aiming for sufficient RSSI for reliable detection. In other words, the excess in signal-to-noise ratio (SNR) at the input of the demodulator is traded off for improved linearity in the front-end circuitry 277 while maintaining relatively good demodulation performance. This scheme helps to improve the receiver intermodulation tolerance. Various PHYs may have different detection levels, which calls for different AGC thresholds (when RSSI crosses the AGC threshold, the gain of the front-end circuitry 277 can be reduced). For example, if the signal PDa indicates detecting PHYa, then the Controller 105 can set the AGC threshold to the value corresponding to the detection level of PHYa. Another example of RSSI-based gain control is described in U.S. Pat. No. 10,469,112, titled "System, apparatus and method for performing automatic gain control in a receiver for a packet-based protocol."

The demodulator 305 demodulates the signal corresponding to PHYa to generate data signals DATAa. The demodulator 310 demodulates the signal corresponding to PHYb to generate data signals DATAb. The respective data signals (DATAa and DATAb) feed the two inputs of the MUX 95. In response to the control signal DATAa/DATAb from the controller 105, the MUX 95 provides either the signal DATAa or the signal DATAb to the FRC 315.

The controller 105 provides band-width adjustment signal (CHF_BW, which may include multiple bits) to the channel filter 85. The CHF_BW signal is used to program the bandwidth of the channel filter 85. Alternatively, the CHF_BW signal may be used to change the shape of the filter characteristics or transfer function. For example, if a PHY is detected then the filter may be changed to provide a matched filter response, i.e., matched to the detected PHY, which may be beneficial for the receive sensitivity.

Figure 12:
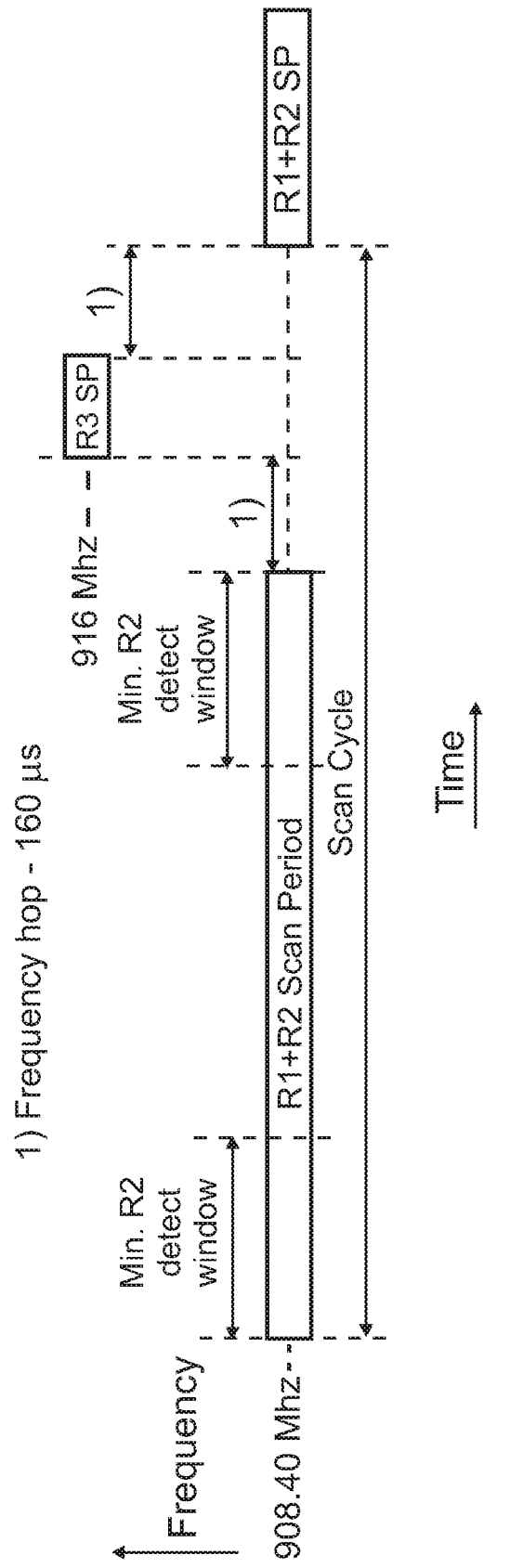
FIG. 12 shows concurrent scanning in an RF receiver according to an exemplary embodiment.
Figure 13:
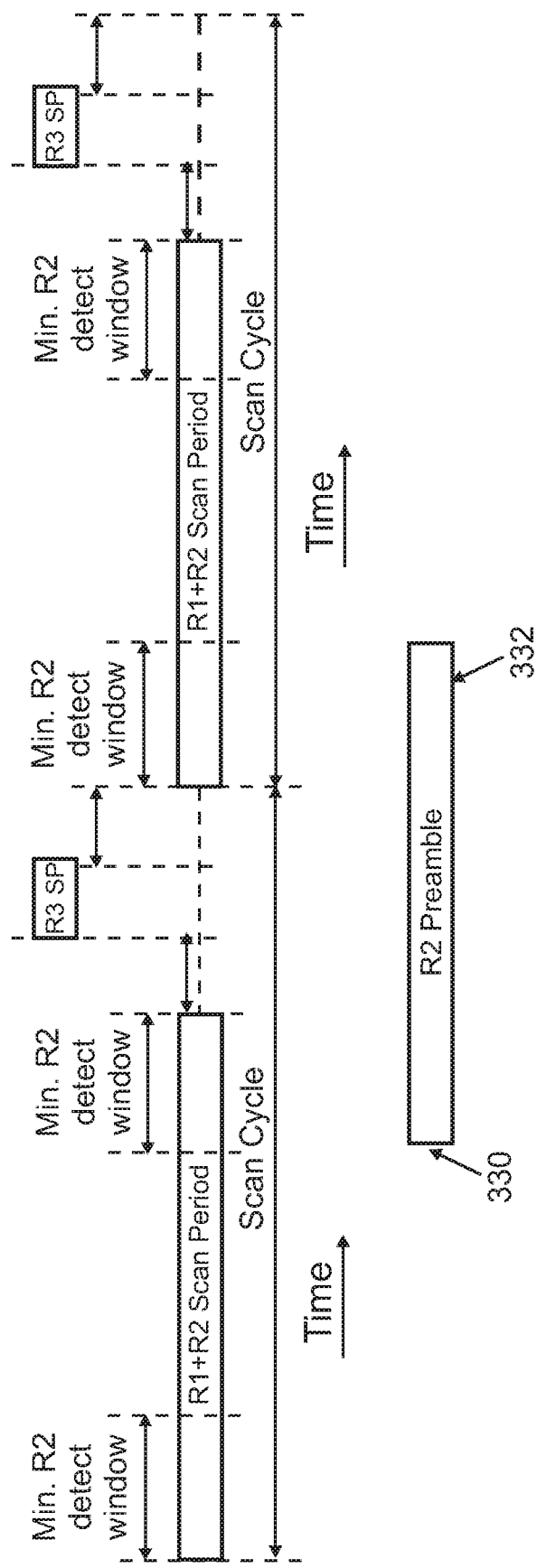
FIG. 13 shows worst-case preamble arrival in an RF receiver according to an exemplary embodiment.

As noted above, the RF receiver in FIG. 11 can scan R1 and R2 concurrently. FIG. 12 shows details of the scanning process, whereas FIG. 13 shows the worst case R2 preamble arrival for a communication system operating according to the Z-wave protocol. Referring again to FIG. 12, the concurrent scanning of the R1 and R2 PHYs (scanning the received RF signals corresponding to the respective two PHYs) reduces the scan cycle. With the same preamble length, the concurrent scanning allows for longer scan periods, hence fewer false preamble detections and higher receiver sensitivity. Note that the "R1+R2 scan period" is dictated by the R1 PHY, since the R1 PHY corresponds to the lower data rate. The R2 detection can be enabled across the whole R1 scan period (SP). R2 scanning should be enabled for at least the "minimum R2 detection window" (labeled "Min. R2 detect. window") length of time. Enabling the R2 scanning across the whole R1 SP, however, allows for even longer R2 detection window.

Referring again to FIG. 13, the point of time labeled 330 indicates that the R2 preamble arrived somewhat late, as a result of which first preamble detection might fail. The point of time labeled 332 indicates that the preamble is within the R2 SP and, hence, can be detected successfully.

In addition to the concurrent preamble detection functionality, RF receivers according to various embodiments have certain other features and attributes. As one example, the FRC 315 and the various blocks in the front-end circuitry 277 (i.e., the shared circuitry 280) may be shared between multiple PHYs. Furthermore, depending on which preamble detector triggers (i.e., which detects a preamble first), various optimizations may be performed.

For example, in some embodiments, PHYa and PHYb may have different channel filter bandwidth specifications. Initially the bandwidth of the channel filter 85 is set to the widest specified bandwidth to be able to receive both PHYs (receive the RF signals corresponding to the PHYs). Improved sensitivity and interference immunity is obtained by adapting the bandwidth of the channel filter 85 to the specified bandwidth of the PHY for which the preamble is detected.

As another example of an optimization or feature, in some embodiments, the different PHYs may have different maximum frequency offsets. Usually, the AFC range has a frequency adjustment limit parameter. This parameter can be set based on which preamble detector is triggering (i.e., for which of the received RF signals corresponding to the respective PHYs a preamble is detected). This limit is used to contain the frequency adjustment within the specified range. Without this limit, the noise on the frequency offset estimate may cause the frequency adjustment to move outside the valid range.

As another example of an optimization or feature, in some embodiments, before the preamble detection, both RSSIa and RSSIb correspond to the same received signal so the values of the RSSIa and RSSIb signals would be substantially (or nearly or almost) the same. After preamble detection, the bandwidth of the channel filter 85 may change, and the AFC may be adjusted. Those events may impact the RSSI signals, so in some embodiments, the RSSI of the associated preamble detection is used for AGC purposes (i.e., the alignment of the gains of the LNA 15 and the PGA 30).

As another example of an optimization or feature, in some embodiments, the FRC 315 may include a variety of features. Such features may include: sync word time out period, sync word detection, PHY header decoding, de-whitening, FEC decoder, address filtering, frame checksum sequence (FCS) check, etc., as desired. The FRC 315 may also process some or all of the Medium Access Control (MAC) functions, such as Frame Control, MAC address filtering, PAN-ID filtering, security processing, handling of Information Elements, etc. For examples of such functions, see the IEEE 802.15.4-2015 standard for more details. In various embodiments, the FRC 315 may be configured (e.g., by using one or more control signals (not shown) provided by the controller 105) to process MAC functions. By using the control signals, the controller 105 may cause or control the enabling, disabling, or configuring of the MAC functions based on pattern detection signals PDa and or PDb. For example, in a multi-protocol receiver application, MAC functions may be selected, based on pattern detection signals PDa and/or PDb. As another example, the receiver may concurrently search for a Zigbee preamble and/or sync word, and a Bluetooth Low Energy (BLE) preamble/Access Address. If a Zigbee signal is detected, the controller 105 may configure the FRC 315 to enable a Zigbee MAC or Zigbee MAC functionality. Conversely, if a BLE signal is detected, the controller 105 may configure the FRC 315 to enable a BLE MAC or BLE MAC functionality. To support the multi-protocol application, the settings and status of the supported protocols may be retained in memory (such as, for example, non-volatile memory (not shown)). The controller 105 may use a memory controller to write the settings and status information from the FRC 315 to a memory, based on pattern detection results. Also, the controller 105 may use a memory controller to read settings and status information from the memory back into the FRC 315, based on pattern detection results. Examples of such settings and status signals include without limitation: the PAN ID, source and destination addresses, supported PHY capabilities, frame control fields, etc. For more settings and status information, see the IEEE 802.15.4-2015 standard.

As another example of an optimization or feature, in some embodiments, the FRC 315 may include a variety of features. Such features may include: sync word time out period, sync word detection, PHY header decoding, de-whitening, FEC decoder, frame checksum sequence (FCS) check, etc., as desired.

Figure 14:
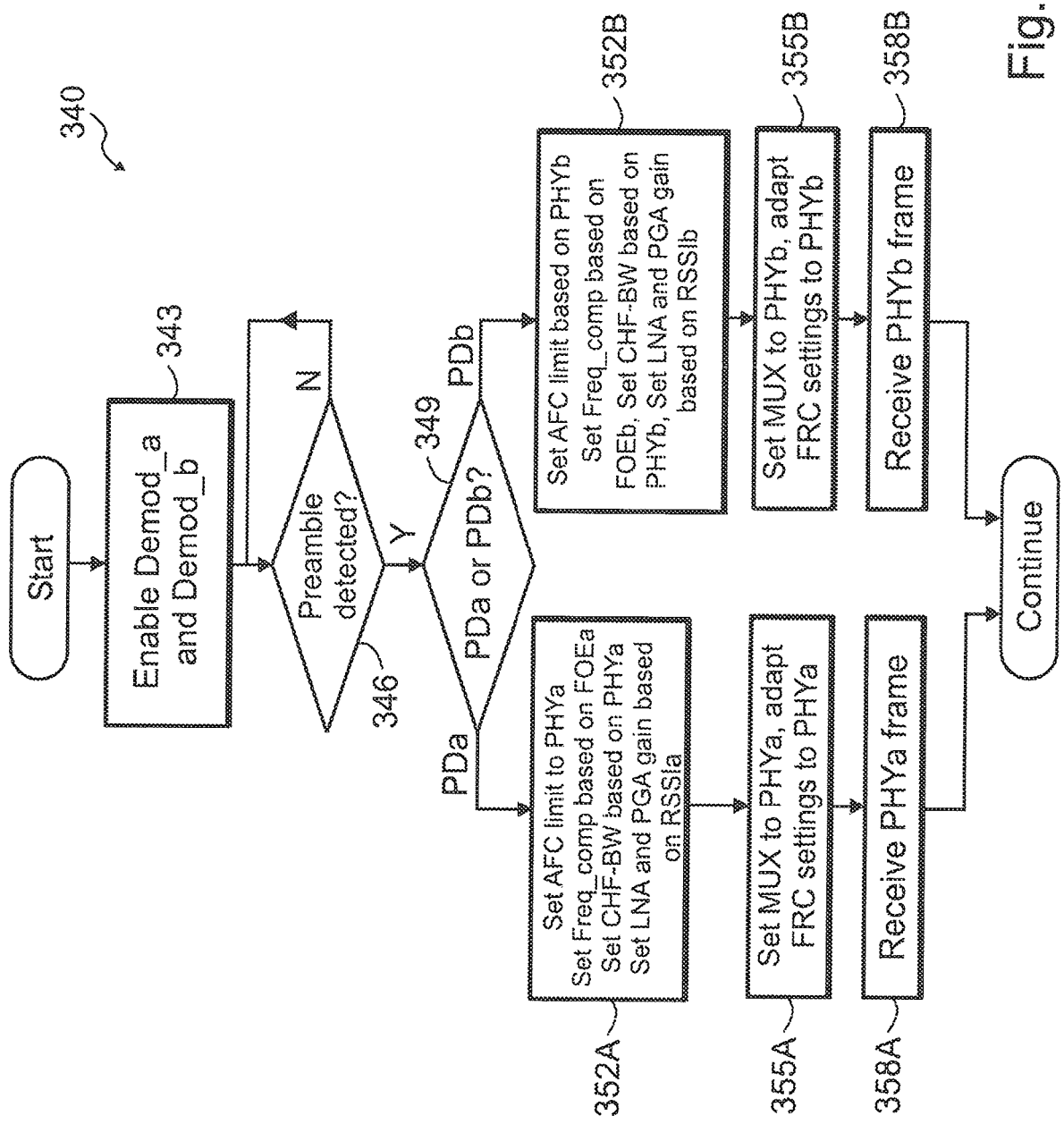
FIG. 14 shows a flow diagram for concurrent detection in an RF receiver according to an exemplary embodiment.

FIG. 14 shows a flow diagram 340 for concurrent detection in an RF receiver according to an exemplary embodiment. The process may be implemented, for example, by the controller 105, described above. Referring again to FIG. 14, at 343, the Demod_a and Demod_b (corresponding, for example, to the demodulator 305 and the demodulator 310, respectively) are enabled. At 346, a check is made for whether a preamble is detected. If not, the checking for preamble detection is continued at 346. If a preamble is detected, however, at 349 a check is made of the signals PDa and PDb to determine which of the demodulators detected the preamble.

If Demod_a detected the preamble (as indicated by PDa), at 352A the AFC limit is set for PHYa, the Freq_comp signal is based on FOEa, the channel filter bandwidth signal CHF_BW is set based on the channel bandwidth specifications for PHYa, and the LNA and PGA gains are set based on RSSIa. At 355A, the MUX 95 is controlled so as to provide the DATAa signals to the FRC 315, and the settings of the FRC 315 are adapted to the parameters of PHYa (the PHY corresponding to the received signal for which the preamble was detected). At 358A, the PHYa frame is received or extracted.

Conversely, if Demod_b detected the preamble (as indicated by PDb), at 352B the AFC limit is set for PHYb, the Freq_comp signal is based on FOEb, the channel filter bandwidth signal CHF_BW is set based on the channel bandwidth specifications for PHYb, and the LNA and PGA gains are set based on RSSIb. At 355B, the MUX 95 is controlled so as to provide the DATAb signals to the FRC 315, and the settings of the FRC 315 are adapted to the parameters of PHYb. At 358B, the PHYb frame is received or extracted.

Figure 15:
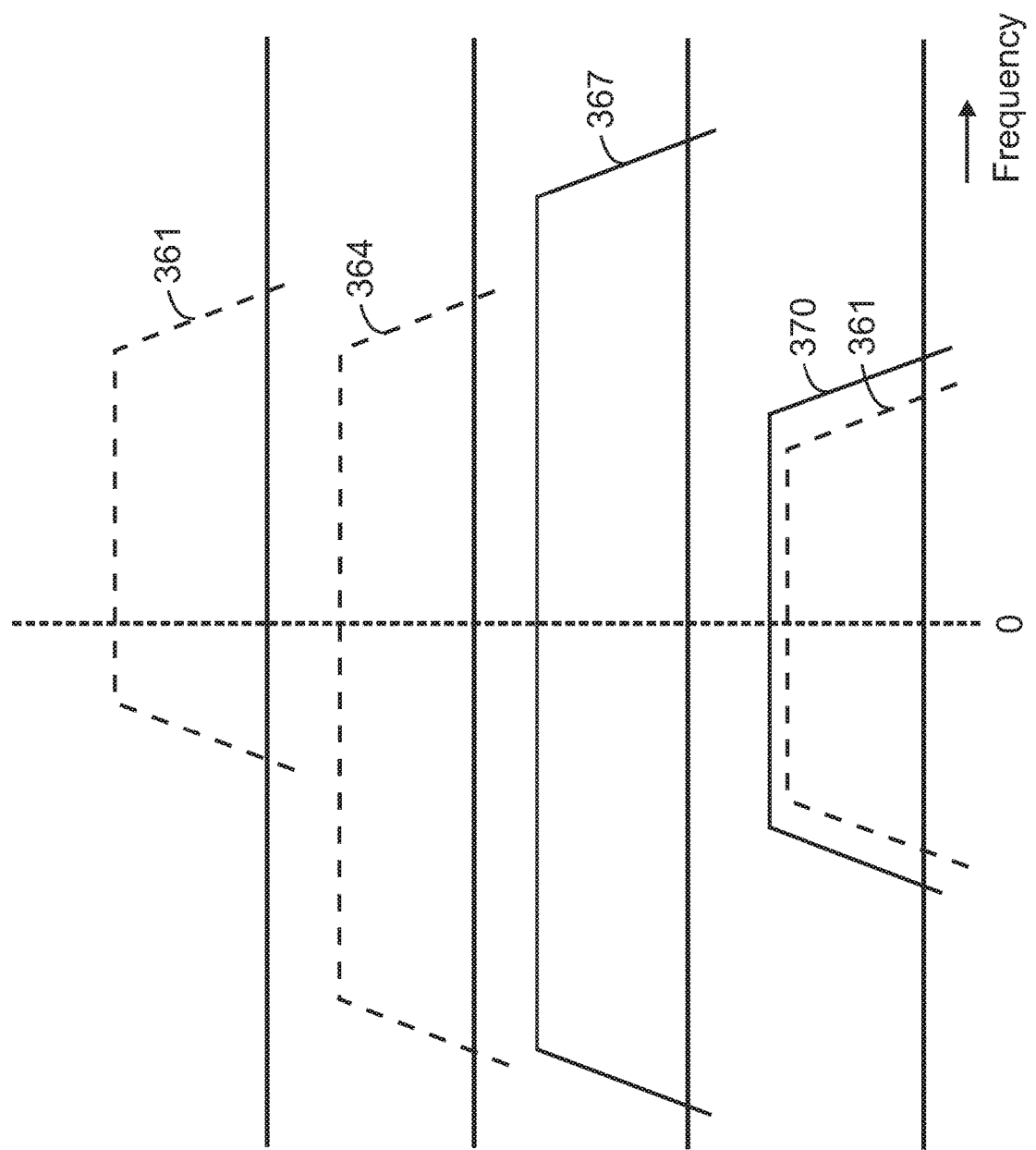
FIG. 15 shows channel filter bandwidth selection in an RF receiver according to an exemplary embodiment.

FIG. 15 shows how the bandwidth of the channel filter 85 is set in RF receivers according to various embodiments. The waveform 361 corresponds to the modulation spectrum for the received RF signal corresponding to PHYa, whereas the waveform 364 corresponds to the modulation spectrum for the received RF signal corresponding to PHYb. The waveforms refer to the frequency at the output of the digital mixer 75. Note that in the example shown, both of the modulation spectra include a worse case frequency offset.

The waveform 367 corresponds to the initial frequency response of the channel filter 85. As noted above, the bandwidth of the channel filter 85 is set such that it accommodates the modulation spectra of both PHYa and PHYb. In the example shown, the waveform 370 shows the frequency response of the channel filter 85 after a PDa trigger (i.e., a preamble corresponding to PHYa is detected). The waveform 361, after AFC settling, is superimposed on the waveform 370 to illustrate the programmed bandwidth of the channel filter 85 in comparison to the waveform 361 (the modulation spectrum for the received RF signal corresponding to PHYa). As the figure shows, the bandwidth of the channel filter 85 is somewhat larger than the maximum spectrum width of the waveform 361 in order to properly accommodate the spectrum of the received RF signal corresponding to PHYa.

Figure 16:
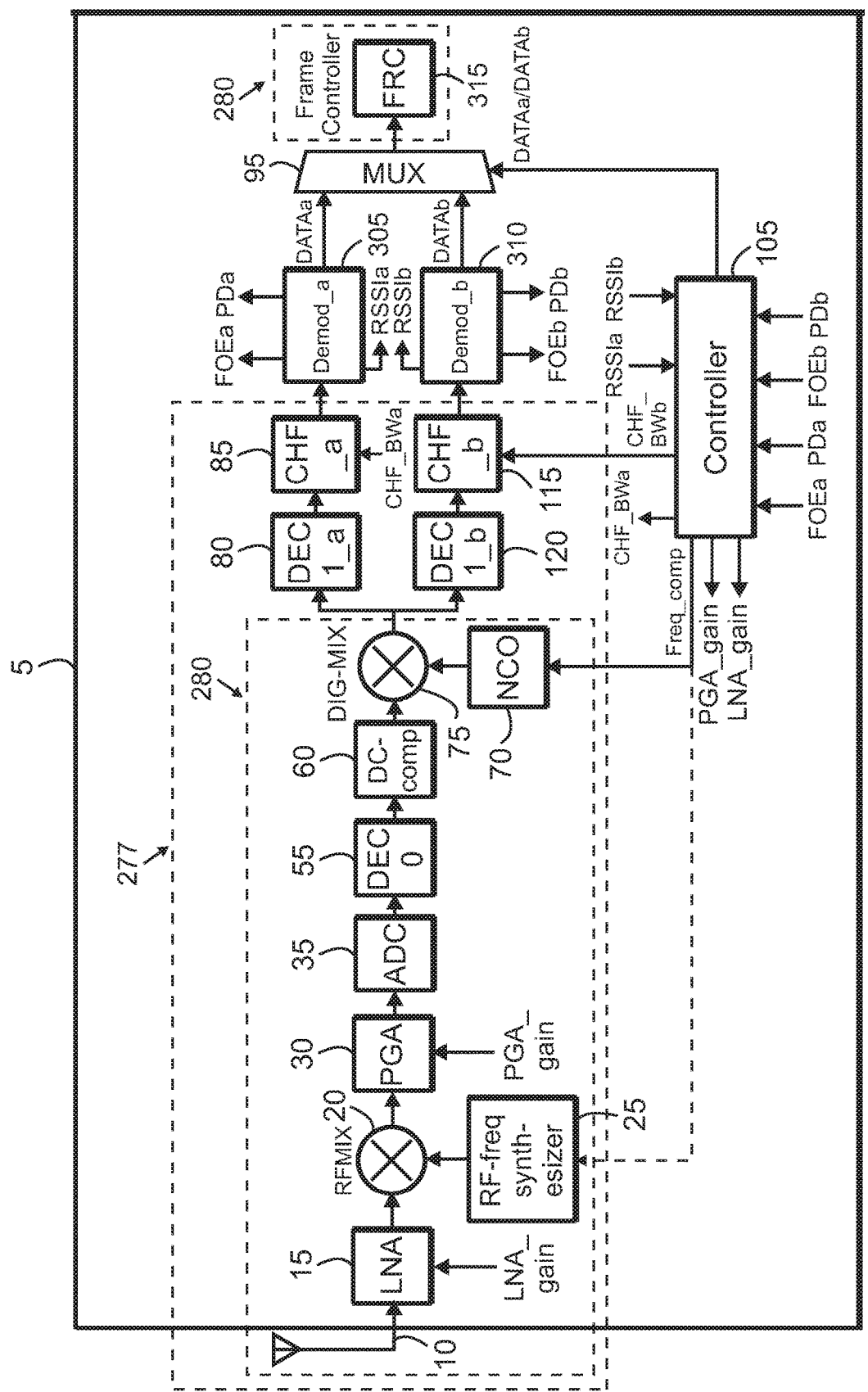
FIG. 16 shows a circuit arrangement for an RF receiver according to an exemplary embodiment.

FIG. 16 shows a circuit arrangement for an RF receiver 5 according to an exemplary embodiment. In this embodiment, by way of example, and without limitation, SUN PHYs are used. More specifically, in the Institute of Electrical and Electronics Engineers (IEEE) standard 802.15.4, several PHYs are specified, including SUN-FSK (frequency shift keying), SUN-OFDM (orthogonal frequency division multiplexing), and SUN-OQPSK (offset quadrature phase shift keying).

In some applications, a single device might be desired to support multiple SUN PHYs (e.g., Wi-SUN is considering adding SUN-OFDM, with backward compatibility with SUN-FSK). FIG. 16 shows an RF receiver that can support multiple SUN PHYs. For example, a transmitter can transmit signals corresponding to either SUN-FSK or SUN-OFDM. The receiver 5 has two demodulators 305 and 310, one for demodulating FSK (say, the demodulator 305), which is a narrow-band (relative to OFDM) signal, and one for demodulating OFDM (say, the demodulator 310), which is a wide-band (relative to FSK) signal.

In this embodiment, the demodulator 310 may use a long training field and short training field (LTF/STF) detector for the OFDM received signal (similar to generating PDa, described above), as persons of ordinary skill in the art will understand. Conversely, the demodulator 305 may use a preamble detector and/or synch word detector to generate the PDb signal, as described above, and as persons of ordinary skill in the art will understand.

In this example, the spectrum corresponding to the SUN-OFDM PHY may be considerable wider than the corresponding spectrum for the SUN-FSK PHY. In the exemplary embodiment shown, separate decimators and channel filters are used to accommodate the spectrum disparity.

More specifically, in the signal path for the demodulator 305, the decimator 80 and the channel filter 85 are used. Conversely, the in the signal path for the demodulator 310, the decimator 120 and the channel filter 115 are used. Note that two separate control signals, CHF_BWa and CHF_BWb, are provided by the controller 105 to program the bandwidths of the channel filters 85 and 115, respectively.

Note that, depending on various factors, in some situations a single decimator and a single channel filter may be used, as persons of ordinary skill in the art will understand. Such factors include design specifications, performance specifications, cost, IC or device area, available technology (e.g., the realizable bandwidth for a channel filter, semiconductor fabrication technology, etc.), target markets, target end-users, and the like, as persons of ordinary skill in the art will understand.

Figure 17:
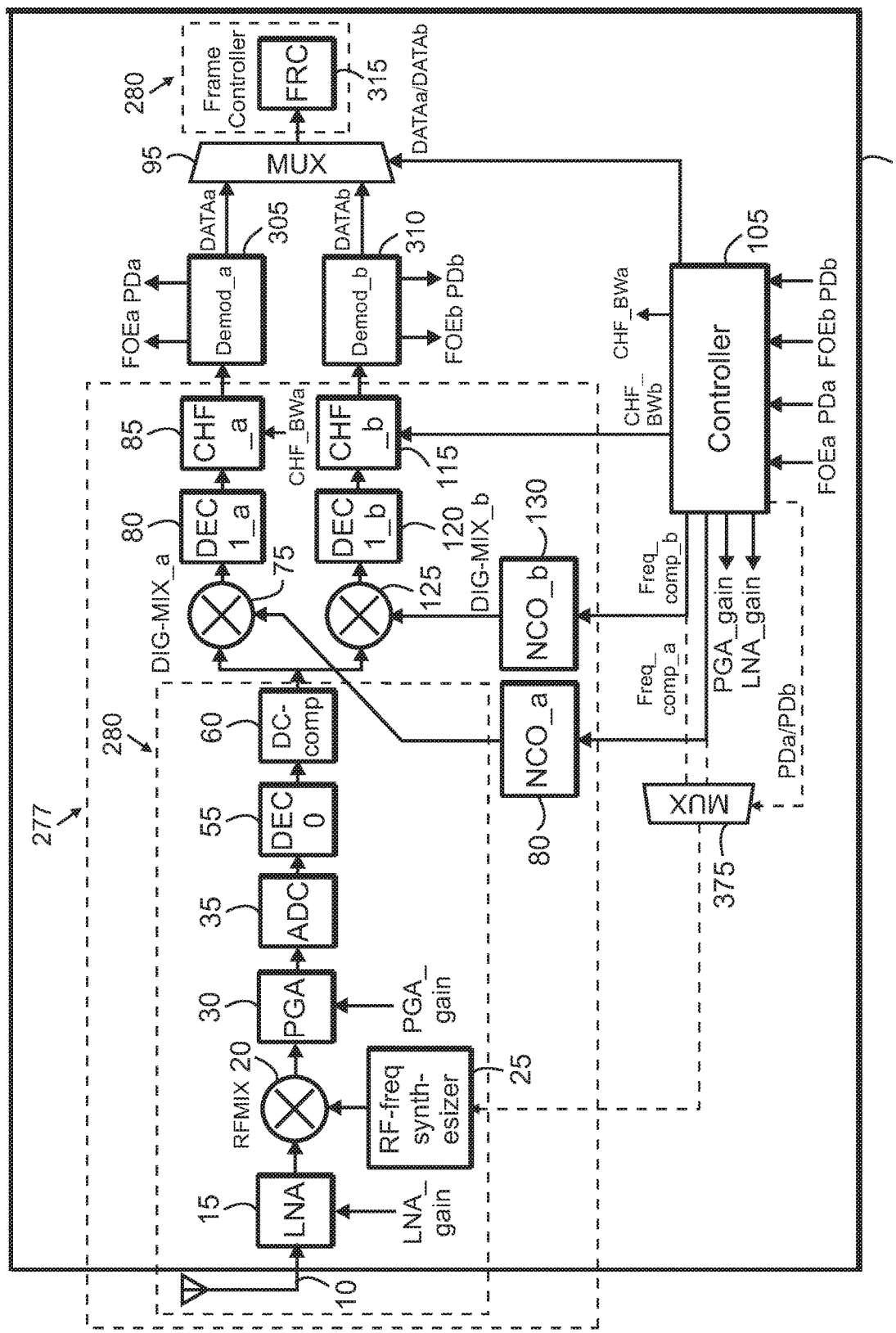
FIG. 17 shows a circuit arrangement for an RF receiver according to an exemplary embodiment.

FIG. 17 shows a circuit arrangement for an RF receiver 5 according to an exemplary embodiment. This embodiment provides concurrent preamble detection on different frequency channels. More specifically, in Z-wave, the R1 PHY signal is transmitted at 908.40 MHz, whereas the R3 PHY is transmitted at 916 MHz. As an alternate method to boost the preamble detection window, the arrival of the R1 and R3 signals may be detected concurrently. FIG. 16 provides the architecture for an RF receiver for doing the concurrent detection. Note that an IF path is not limited to a single demodulator. Thus, as an example, IF path_a could be used for the R1 and R2 PHYs, whereas IF path_b could be used for the R3 PHY. In this configuration, the R1, R2 and R3 PHYs could be searched for concurrently.

Because the transmitted signals corresponding to R1 and R3 use different frequencies, two NCOs are used: the NCO 80 for one PHY (say, R1), and the NCO 130 for the other PHY (say, R3). Similar to the embodiment in FIG. 16, separate decimators and channel filters are used for the receive signal paths corresponding to the two PHYs. More specifically, the decimator 80 and the channel filter 85 are use for the receive signal path corresponding one PHY (e.g., R1), and the decimator 120 and the channel filter 115 are used for the receive signal path corresponding to the other PHY (e.g., R3).

The controller 105 generates signals Freq_comp_a and Freq_comp_b, which are used to set the output frequencies of the NCO 80 and the NCO 130, respectively. In addition, the signals Freq_comp_a and Freq_comp_b are provided as input signals to MUX 375. In response to the select signal (PDa/PDb, i.e., which of the demodulators 305 and 310 detected a preamble), provided by the controller 105, the MUX 375 provides either the Freq_comp_a or the Freq_comp_b to RF frequency synthesizer 25. The RF frequency synthesizer 25 uses the output signal of the MUX 375 to set its output frequency (the LO signal used by mixer 20).

Note that in the exemplary embodiments shown above, receivers for concurrent detection of two preambles are shown (e.g., RF receivers including two demodulators, 305 and 310, respectively). As persons of ordinary skill in the art will understand, however, RF receivers according to other embodiments may be used for concurrent detection of more than two preambles by making appropriate modifications (e.g., using more than two demodulators, decimators, channel filters, etc.), as desired. The choice of the number of concurrently detected preamble depends on a variety of factors, as persons of ordinary skill in the art will understand. Such factors include design specifications, performance specifications, cost, IC or device area, available technology, such as semiconductor fabrication technology, target markets, target end-users, etc.

A network may use one PHY to initiate a switch to another PHY. For example, in BLE, the PHY is set after a connection by examining the capabilities and configuration for both devices in a procedure that is known as the PHY Update Procedure. For more information see the Bluetooth Specification Version 5.0, Vol. 6, Part B, Section 5.1.10. The concurrent PHY detecting capability according to various embodiments would render the PHY Update Procedure unnecessary. This attribute would reduce the latency and power consumption associated with the overhead of the PHY Update Procedure. For example, if the link quality permits, a node may decide to transmit using a higher rate PHY immediately, and the receiver, incorporating the concurrent detection according to various embodiments, would be able to receive the higher rate PHY. To support concurrent detection, nodes may share the concurrent detection capability with other nodes by sending a PHY-capabilities field so that the other nodes can take advantage by using the concurrent detection capability. In addition, the PHYs that are part of the concurrent detection may be included in the shared PHY capabilities field. In the IEEE 802.15.4 standard, the concurrent detection capability can be conveyed using the PHY capabilities IE (e.g., see IEEE 802.15.4-2015, clause 7.4.4.10). In addition the PHY capabilities IE may include the PHYs that are part of the concurrent detection scheme or arrangement. By sharing the concurrent detection capabilities, networks may have a migration path, from a legacy PHY switching method (e.g., the PHY Update Procedure in BLE) to a more advantageous concurrent detection method.

Note that, in some embodiments, the controller 105 may provide fewer control signals than shown in the figures, as desired, and as persons of ordinary skill in the art will understand. For example, in some embodiments, the controller 105 may provide a single control signal, i.e., the band-width adjustment signal, i.e., the CHF_BW signal (which may include multiple bits, or the CHF_BWa and CHF_BWb signals, etc., if two or more channel filters are used), described above. In some embodiments, in addition to the band-width adjustment signal(s), other control signals may be provided by the controller 105, i.e., one or more of the PGA_gain signal, the LNA_gain signal, control signal(s) provided to the FRC 315, etc., as persons of ordinary skill in the art will understand. The choice of the type and number of control signals depends on various factors, as persons of ordinary skill in the art will understand. Such factors include design specifications, performance specifications, cost, IC or device area, available technology, target markets, target end-users, and the like, as persons of ordinary skill in the art will understand.

Figure 18:
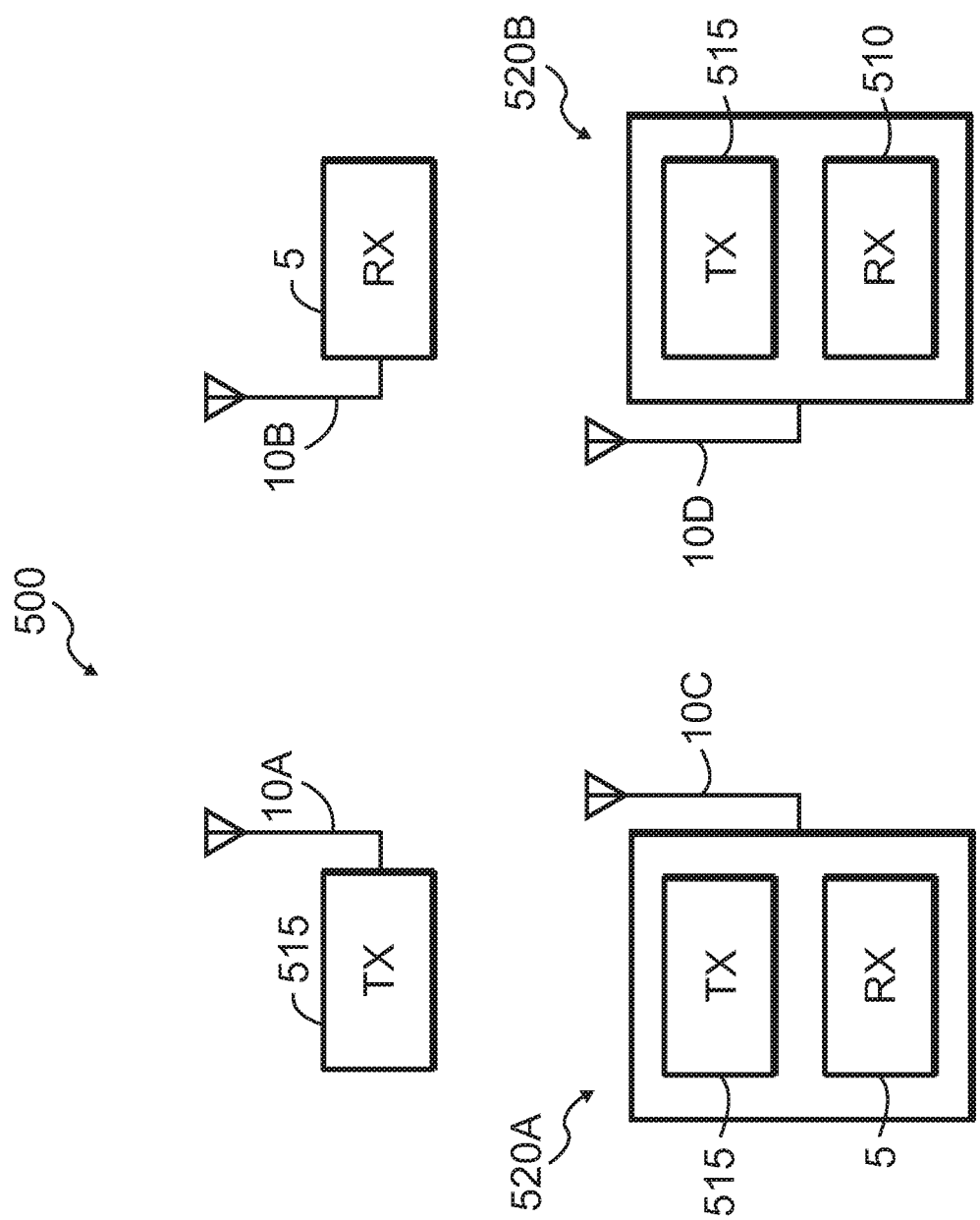
FIG. 18 shows a system for radio communication according to an exemplary embodiment.

Receivers according to exemplary embodiments may be used in a variety of communication arrangements, systems, sub-systems, networks, etc., as desired. FIG. 18 shows a system 500 for radio communication according to an exemplary embodiment. The system includes RF receivers 5, as described above.

System 500 includes a transmitter 515, coupled to antenna 10A. Via antenna 10A, transmitter 515 transmits RF signals. The RF signals may be received by receiver 5 via antenna 10B. In addition, or alternatively, transceiver 520A and/or transceiver 520B might receive (via receivers 5) the transmitted RF signals.

In addition to receive capability, transceiver 520A and transceiver 520B can also transmit RF signals. The transmitted RF signals might be received by receiver 5, either in the stand-alone receiver, or via the receiver circuitry of the non-transmitting transceiver.

Other systems or sub-systems with varying configuration and/or capabilities are also contemplated. For example, in some exemplary embodiments, two or more transceivers (e.g., transceiver 520A and transceiver 520B) might form a network, such as an ad-hoc network. As another example, in some exemplary embodiments, transceiver 520A and transceiver 520B might form part of a network, for example, in conjunction with transmitter 515.

Figure 19:
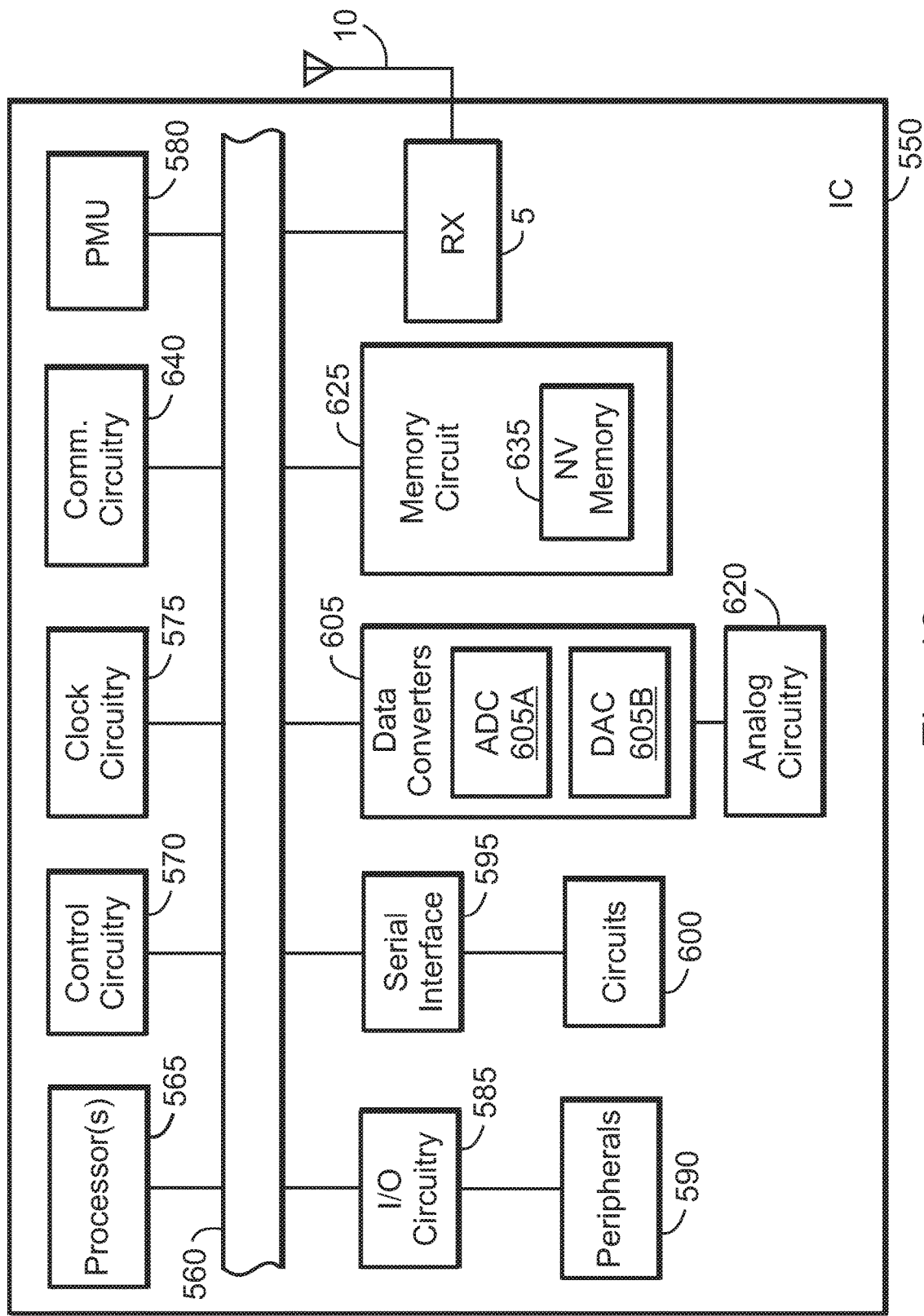
FIG. 19 shows a circuit arrangement for an IC, including an RF receiver, according to an exemplary embodiment.
Figure 20:
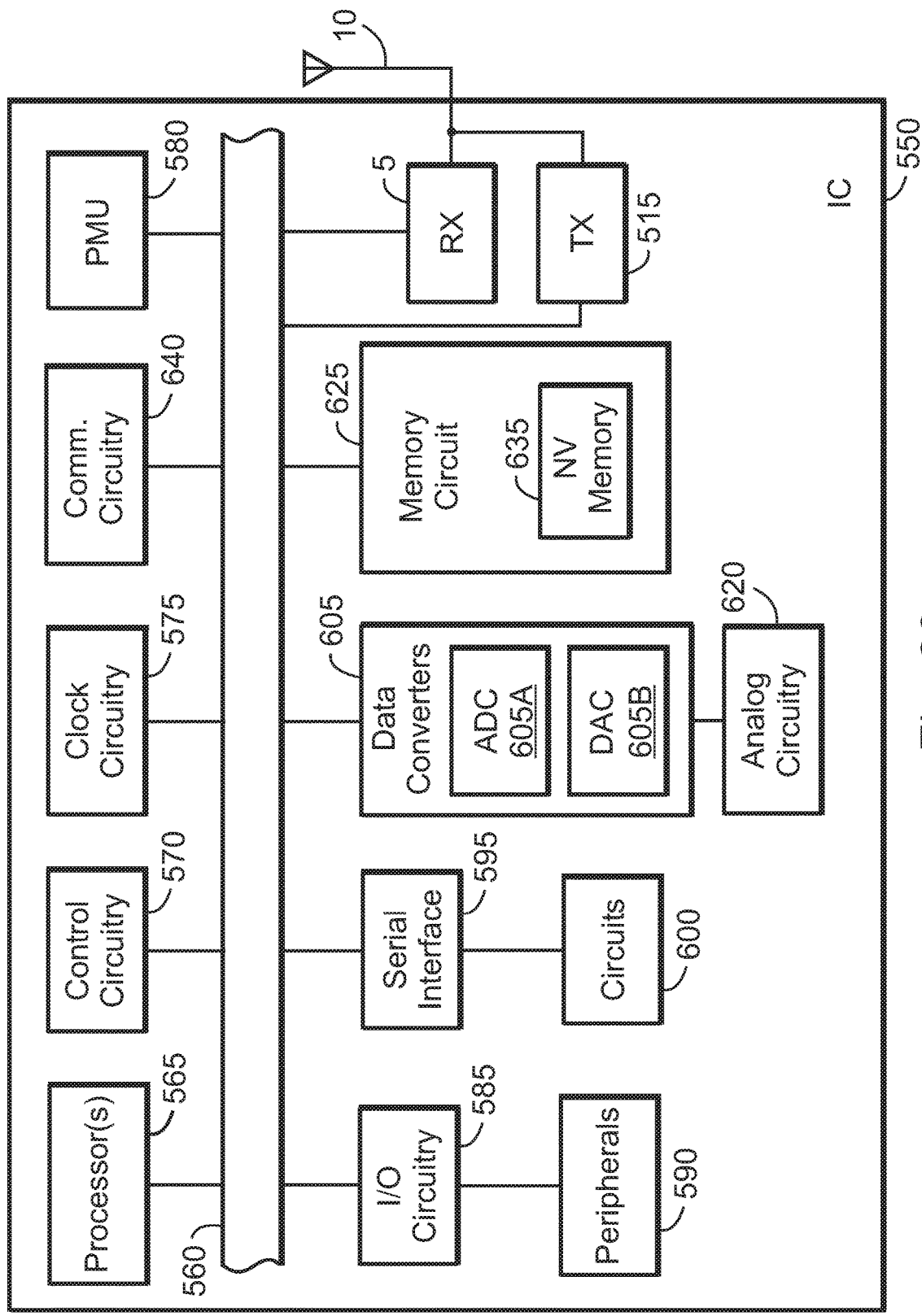
FIG. 20 shows a circuit arrangement for an IC, including an RF receiver and an RF transmitter, according to an exemplary embodiment.

RF receivers, such as RF receiver 5 described above, may be used in a variety of circuits, blocks, subsystems, and/or systems. For example, in some embodiments, such RF receivers may be integrated in an IC, such as a microcontroller unit (MCU). FIG. 19 shows a block diagram of an IC 550 according to an exemplary embodiment. FIG. 20 is similar to the embodiment of FIG. 19, and shows an IC 550 that, in addition to the RF receiver 5, also includes RF transmitter 515. Thus, the embodiment in FIG. 20 has RF transceiver capability.

Referring to FIG. 19, IC 550 constitutes or includes an MCU. IC 550 includes a number of blocks (e.g., processor(s) 565, data converters 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

Clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 565, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converters 605. Data converters 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause PMU 580, and circuitry such as RF receiver 5 or various blocks, circuits, or components of it, to reset to an initial or known state.

In exemplary embodiments, control circuitry 570 may include a variety of types and blocks of circuitry. In some embodiments, control circuitry 570 may include logic circuitry, finite-state machines (FSMs), or other circuitry to perform operations such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 565, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to the operation of RF receiver 5, such as configuration information for various blocks, circuits, components, etc. of RF receiver 5.

Various circuits and blocks including digital and/or mixed-signal circuitry described above and used in exemplary embodiments may be implemented in a variety of ways and using a variety of circuit elements or blocks. For example, the RF frequency synthesizer 25, the ADC 35, the decimator 55, the DC compensation circuit 60, the digital mixer 75, the decimator 80/120, the channel filter 85/115, the NCO 70/130, the MUX 95, the demodulator 305, the demodulator 310, and the FRC 315 may generally be implemented using digital circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Various circuits and blocks including analog circuitry described above and used in exemplary embodiments may be implemented in a variety of ways and using a variety of circuit elements or blocks. For example, the LNA 15, the mixer 20, and the PGA 30 may generally be implemented using analog circuitry. The analog circuitry may include bias circuits, decoupling circuits, coupling circuits, supply circuits, current mirrors, current and/or voltage sources, filters, amplifiers, converters, signal processing circuits (e.g., multipliers), sensors or detectors, transducers, discrete components (transistors, diodes, resistors, capacitors, inductors), analog MUXs, and the like, as desired, and as persons of ordinary skill in the art will understand. In addition, digital circuitry or mixed-signal circuitry or both may be included. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus comprising:
a radio-frequency (RF) receiver for receiving an RF signal, the RF receiver comprising:
front-end circuitry to generate a down-converted signal;
a plurality of signal detectors to generate from the down-converted signal a plurality of detection signals and a plurality of frequency offset estimates;
at least one compensation circuit to compensate for frequency offset; and
a controller to provide at least one frequency offset estimate in the plurality of frequency offset estimates to the at least one compensation circuit based on the plurality of detection signals.

2. The apparatus according to claim 1, wherein the plurality of signal detectors comprises a plurality of preamble detectors.

3. The apparatus according to claim 1, wherein the plurality of signal detectors comprises a plurality of synchronization (sync) word detectors.

4. The apparatus according to claim 1, wherein the plurality of signal detectors operates concurrently to detect a plurality of different physical layers (PHYs).

5. The apparatus according to claim 1, wherein the controller provides to the front-end circuitry at least one adjustment signal, and wherein front-end circuitry comprises a filter to filter the RF signal using the at least one adjustment signal to control a bandwidth of the filter.

6. The apparatus according to claim 1, wherein the front-end circuitry comprises a mixer and an oscillator to apply a frequency shift to the RF signal by using a control signal provided by the controller to control an oscillation frequency of the oscillator.

7. The apparatus according to claim 1, wherein the front-end circuitry comprises an amplifier to amplify the RF signal, wherein the amplifier has a programmable gain, and a control signal provided by the controller controls the gain of the amplifier.

8. The apparatus according to claim 1, wherein the front-end circuitry comprises:
a first channel filter to filter a wide-band receive signal to generate a filtered wide-band receive signal; and
a second channel filter to filter a narrow-band receive signal to generate a filtered narrow-band receive signal.

9. The apparatus according to claim 8, further comprising:
a first signal detector to detect a wide-band signal from the filtered wide-band receive signal; and
a second signal detector to detect a narrow-band signal from the filtered narrow-band receive signal.

10. An apparatus comprising:
a radio frequency (RF) receiver for receiving a receive signal, the RF receiver comprising:
front-end circuitry to generate a first down-converted signal from the receive signal;
a plurality of preamble detectors to generate a plurality of detection signals and a plurality of frequency offset estimations from the first down-converted signal;
at least one compensation circuit to compensate for frequency offset; and
a controller to provide at least one frequency offset estimate in the plurality of frequency offset estimates to the at least one compensation circuit based on the plurality of detection signals.

11. The apparatus according to claim 10, further comprising a digital mixer to generate a second down-converted signal from the first down-converted signal.

12. The apparatus according to claim 11, further comprising a plurality of channel filters to filter signals derived from the second down-converted signals to generate a plurality of filtered signals.

13. The apparatus according to claim 12, wherein the plurality of preamble detectors receive the plurality of filtered signals, and wherein the plurality of preamble detectors generate the plurality of detection signals based on the plurality of filtered signals.

14. The apparatus according to claim 13, wherein the controller controls respective bandwidths of the plurality of channel filters based on whether a signal in the plurality of detection signals indicates detection of a preamble.

15. A method of operating a radio-frequency (RF) receiver, the method comprising:
generating, by using a front-end circuit, a down-converted signal from an RF signal;
generating, by using a plurality of signal detectors a plurality of detection signals and a plurality of frequency offset estimates from signals derived from the down-converted signal;
using at least one compensation circuit to compensate for frequency offset; and
providing, by using a controller, at least one frequency offset estimate in the plurality of frequency offset estimates to the compensation circuit based on the plurality of detection signals.

16. The method according to claim 15, wherein generating, by using the plurality of signal detectors, the plurality of detection signals from signals derived from the down-converted signal comprises using a plurality of preamble detectors.

17. The method according to claim 15, wherein generating, by using the plurality of signal detectors, the plurality of detection signals from signals derived from the down-converted signal comprises operating the plurality of signal detectors concurrently to detect a plurality of different physical layers (PHYs).

18. The method according to claim 15, further comprising using a plurality of channel filters to filter signals derived from the down-converted signal to generate a plurality of filtered signals.

19. The method according to claim 18, wherein generating, by using the plurality of signal detectors, the plurality of detection signals from signals derived from the down-converted signal comprises using the plurality of filtered signals to generate the plurality of detection signals.

20. The method according to claim 19, further comprising controlling, by using the controller, respective bandwidths of the plurality of channel filters based on whether a signal in the plurality of detection signals indicates detection of a preamble.

* * * * *